US012634505B2

(12) United States Patent
Paluri et al.

(10) Patent No.: US 12,634,505 B2
(45) Date of Patent: May 19, 2026

(54) MDMVR-BASED IMAGE CODING METHOD AND DEVICE

(71) Applicant: LG Electronics Inc., Seoul (KR)

(72) Inventors: Seethal Paluri, Seoul (KR);
Seunghwan Kim, Seoul (KR)

(73) Assignee: LG Electronics Inc., Seoul (KR)

( * ) Notice: Subject to any disclaimer, the term of this
patent is extended or adjusted under 35
U.S.C. 154(b) by 0 days.

(21) Appl. No.: 18/693,881

(22) PCT Filed: Sep. 30, 2022

(86) PCT No.: PCT/KR2022/014755
§ 371 (c)(1),
(2) Date: Mar. 20, 2024

(87) PCT Pub. No.: WO2023/055171
PCT Pub. Date: Apr. 6, 2023

(65) Prior Publication Data
US 2024/0397078 A1 Nov. 28, 2024

Related U.S. Application Data

(60) Provisional application No. 63/251,041, filed on Oct.
1, 2021.

(51) Int. Cl.
*H04N 19/513* (2014.01)
*H04N 19/139* (2014.01)
(Continued)

(52) U.S. Cl.
CPC ......... *H04N 19/513* (2014.11); *H04N 19/139*
(2014.11); *H04N 19/176* (2014.11); *H04N*
*19/57* (2014.11); *H04N 19/70* (2014.11)

(58) Field of Classification Search
CPC .............. H04N 19/513; H04N 19/139; H04N
19/176; H04N 19/57; H04N 19/70;
(Continued)

(56) References Cited

U.S. PATENT DOCUMENTS

2020/0244956 A1* 7/2020 Lee ...................... H04N 19/124
2020/0404253 A1* 12/2020 Chen ...................... B23P 15/00
(Continued)

FOREIGN PATENT DOCUMENTS

KR 10-2020-0017406 2/2020
KR 10-2021-0107733 9/2021
(Continued)

OTHER PUBLICATIONS

Chang et al., "EE2: Tests of compression efficiency methods beyond
VVC," JVET-V0120-v2, Joint Video Experts Team (JVET) of
ITU-T SG 16 WP 3 and ISO/IEC JTC 1/SC 29, 22nd Meeting, by
teleconference, Apr. 20-28, 2021, 202 pages.
Office Action in Japanese Appln. No. 2024-519056, mailed on Feb.
4, 2025, 9 pages (with English translation).
(Continued)

*Primary Examiner* — Nam D Pham
(74) *Attorney, Agent, or Firm* — Fish & Richardson P.C.

(57) ABSTRACT
An image decoding method performed by a decoding device
is provided. The method comprises the steps of: determining
whether to use a multi-layer decoder-side motion vector
refinement (MDMVR) for a current block; deriving a refined
motion vector for the current block on the basis of using the
MDMVR for the current block; deriving prediction samples
for the current block on the basis of the refined motion
vector; and generating reconstruction samples for the current
block on the basis of the prediction samples.

12 Claims, 13 Drawing Sheets

(51) Int. Cl.
    *H04N 19/176*     (2014.01)
    *H04N 19/57*     (2014.01)
    *H04N 19/70*     (2014.01)

(58) Field of Classification Search
    CPC .... H04N 19/105; H04N 19/13; H04N 19/132;
            H04N 19/147; H04N 19/30; H04N 19/52;
                                        H04N 19/577
    See application file for complete search history.

(56)               References Cited

U.S. PATENT DOCUMENTS

| | | | | |
|---|---|---|---|---|
| 2022/0368916 | A1* | 11/2022 | Zhang | H04N 19/159 |
| 2024/0031611 | A1* | 1/2024 | Galpin | H04N 19/85 |

FOREIGN PATENT DOCUMENTS

| | | |
|---|---|---|
| WO | WO 2020/186275 | 9/2020 |
| WO | WO 2021/085596 | 4/2021 |

OTHER PUBLICATIONS

Gao et al., "Decoder-Side Motion Vector Refinement in VVC: Algorithm and Hardware Implementation Considerations," IEEE Transactions on Circuits and Systems for Video Technology, Aug. 2021, 31(8):3197-3211.

International Search Report and Written Opinion in International Appln. No. PCT/KR2022/014755, mailed on Jan. 6, 2023, 10 pages (with partial English translation).

Coban et al., "Preliminary draft of algorithm description for Enhanced Compression Model 1 Software (ECM 1)," Joint Video Experts Team (JVET) of ITU-T SG 16 WP 3 and ISO/IEC JTC 1/SC 29, 23rd Meeting, by teleconference, JVET-W0102-v2, Jul. 2021, 18 pages.

Extended European Search Report in European Appln. No. 22876943. 6, mailed on Sep. 11, 2025, 9 pages.

Sethuraman, "Non-CE9: Header flags to disable DMVR and BDOF at finer granularities," Joint Video Experts Team (JVET) of ITU-T SG 16 WP 3 and ISO/IEC JTC 1/SC 29/WG 11, 15th Meeting: Gothenburg, Sweden, JVET-O0504-v1, Jul. 2019, 3 pages.

* cited by examiner

FIG. 3

DETERMINE WHETHER TO USE MDMVR
FOR CURRENT BLOCK — S1100

DERIVE REFINED MOTION VECTOR FOR
CURRENT BLOCK BASED ON MDMVR BEING USED
FOR CURRENT BLOCK — S1110

DERIVE PREDICTION SAMPLES FOR CURRENT BLOCK
BASED ON REFINED MOTION VECTOR — S1120

GENERATE RECONSTRUCTED SAMPLES FOR
CURRENT BLOCK BASED ON PREDICTION SAMPLES — S1130

MDMVR-BASED IMAGE CODING METHOD AND DEVICE

CROSS-REFERENCE TO RELATED APPLICATIONS

This application is a National Stage application under 35 U.S.C. § 371 of International Application No. PCT/KR2022/014755, filed on Sep. 30, 2022, which claims the benefit of U.S. Provisional Application No. 63/251,041, filed on Oct. 1, 2021. The disclosures of the prior applications are incorporated by reference in their entirety.

TECHNICAL FIELD

The present disclosure relates to video or image coding technology, and for example, multi-layer decoder-side motion vector refinement (MDMVR)-based image coding technology.

BACKGROUND

Recently, the demand for high resolution, high quality image/video such as 4K, 8K or more Ultra High Definition (UHD) video/image is increasing in various fields. As the video/image resolution or quality becomes higher, relatively more amount of information or bits are transmitted than for conventional video/image data. Therefore, if video/image data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual video/image, such as game images/videos, are also growing.

Therefore, a highly efficient image/video compression technique is required to effectively compress and transmit, store, or play high resolution, high quality videos/images showing various characteristics as described above.

SUMMARY

The technical problem of the present disclosure is to provide a method and an apparatus for improving video/image coding efficiency.

Another technical problem of the present disclosure is to provide an image coding method and apparatus based on DMVR using multiple layers to increase inter coding efficiency.

According to an embodiment of the present disclosure, an image decoding method performed by a decoding apparatus is provided. The method includes determining whether multi-layer Decoder-side Motion Vector Refinement (MDMVR) is used for a current block, deriving a refined motion vector for the current block based on the MDMVR being used for the current block, deriving prediction samples for the current block based on the refined motion vector, and generating reconstructed samples for the current block based on the prediction samples.

According to another embodiment of the present disclosure, an image encoding method performed by an encoding apparatus is provided. The method includes determining whether multi-layer Decoder-side Motion Vector Refinement (MDMVR) is used for a current block, deriving a refined motion vector for the current block based on the MDMVR being used for the current block, deriving prediction samples for the current block based on the refined motion vector, deriving residual samples based on the prediction samples, generating a bitstream by encoding image information including information on the residual samples.

According to another embodiment of the present disclosure, a computer-readable digital storage medium storing a bitstream and/or encoded video/image information generated according to the video/image encoding method disclosed in at least one of the embodiments of the present disclosure is provided.

According to another embodiment of the present disclosure, a transmission method for data comprising a bitstream of image information is provided. The transmission method includes obtaining the bitstream of the image information, wherein the bitstream is generated based on determining whether multi-layer Decoder-side Motion Vector Refinement (MDMVR) is used for a current block, deriving a refined motion vector for the current block based on the MDMVR being used for the current block, deriving prediction samples for the current block based on the refined motion vector, deriving residual samples based on the prediction samples, encoding image information including information on the residual samples, and transmitting the data comprising the bitstream.

The present disclosure can have various effects. For example, according to the present disclosure, overall image/video compression efficiency can be improved. In addition, according to the present disclosure, image coding based on decoder side motion vector refinement using efficient multiple layers can be performed. In addition, according to the present disclosure, it is possible to provide a decoder side motion vector refinement method using multiple layers that may improve the performance of the inter-coding structure and not increase processing complexity. In addition, according to the present disclosure, processing efficiency can be increased without increasing processing complexity by providing various methods to determine whether to use decoder side motion vector refinement using multiple layers.

The effects that can be achieved through specific embodiments of the present disclosure are not limited to the effects listed above. For example, there may be various technical effects that a person having ordinary skill in the related art can understand or derive from the present disclosure. Accordingly, the specific effects of the present disclosure are not limited to those explicitly described in the present disclosure, and may include various effects that can be understood or derived from the technical features of the present disclosure.

BRIEF DESCRIPTION OF THE DRAWINGS

FIG. 3 is a schematic diagram illustrating a configuration of a video/image decoding apparatus to which the embodiment(s) of the present disclosure may be applied.

DETAILED DESCRIPTION

Figure 1:
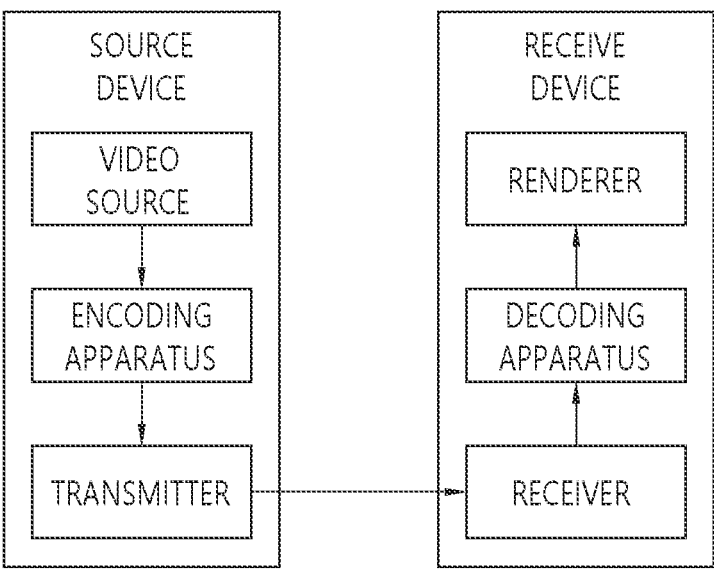
FIG. 1 schematically illustrates an example of a video/image coding system to which the embodiments of the present disclosure may be applied.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

In the present disclosure. "A or B" may mean "only A", "only B" or "both A and B". In other words, in the present disclosure, "A or B" may be interpreted as "A and/or B". For example, in the present disclosure, "A, B or C" may mean "only A", "only B", "only C", or "any combination of A, B and C".

A slash (/) or a comma used in the present disclosure may mean "and/or". For example, "A/B" may mean "A and/or B". Accordingly, "A/B" may mean "only A", "only B", or "both A and B". For example, "A, B. C" may mean "A, B, or C".

In the present disclosure, "at least one of A and B" may mean "only A", "only B" or "both A and B". Also, in the present disclosure, the expression "at least one of A or B" or "at least one of A and/or B" may be interpreted the same as "at least one of A and B".

Also, in the present disclosure, "at least one of A, B and C" may mean "only A", "only B", "only C", or "any combination of A, B and C". Also, "at least one of A, B or C" or "at least one of A, B and/or C" may mean "at least one of A. B and C".

In addition, parentheses used in the present disclosure may mean "for example". Specifically, when "prediction (intra prediction)" is indicated, "intra prediction" may be proposed as an example of "prediction". In other words, "prediction" in the present disclosure may be not limited to "intra prediction", and "intra prediction" may be proposed as an example of "prediction". Also, even when "prediction (i.e., intra prediction)" is indicated, "intra prediction" may be proposed as an example of "prediction".

The present disclosure relates to video/image coding. For example, the methods/embodiments disclosed in the present disclosure may be applied to the method disclosed in a versatile video coding (VVC) standard. Further, the methods/exemplary embodiments disclosed in the present disclosure are applicable to a method disclosed in an essential video coding (EVC) standard, an AOMedia Video 1 (AV1) standard, a 2nd generation of audio video coding (AVS2) standard, or a next-generation video/image coding standard (e.g., H.267 or H.268, etc.).

The present disclosure presents various embodiments of video/image coding, and the embodiments may be performed in combination with each other unless otherwise mentioned.

In the present disclosure, a video may mean a group of a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. Also, a subpicture may represent a rectangular region of one or more slices within a picture. That is, a subpicture may contain one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (e.g., cb, cr) blocks. The unit may be used interchangeably with terms such as block or area in some cases. In a general case, an M×N block may include samples (or sample arrays) or a set (or array) of transform coefficients of M columns and N rows.

Technical features that are individually described in one drawing in the present disclosure may be implemented individually or may be implemented at the same time.

The following drawings were created to explain a specific example of the present disclosure. Since the names of specific devices described in the drawings or the names of specific signals/messages/fields are presented as an example, the technical features of the present disclosure are not limited to the specific names used in the following drawings.

Hereinafter, exemplary embodiments of the present disclosure will be described in detail with reference to the accompanying drawings. Hereinafter, the same reference numerals are used for the same components in the drawings, and redundant description of the same components may be omitted.

FIG. 1 schematically illustrates an example of a video/image coding system to which the embodiments of the present disclosure may be applied.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
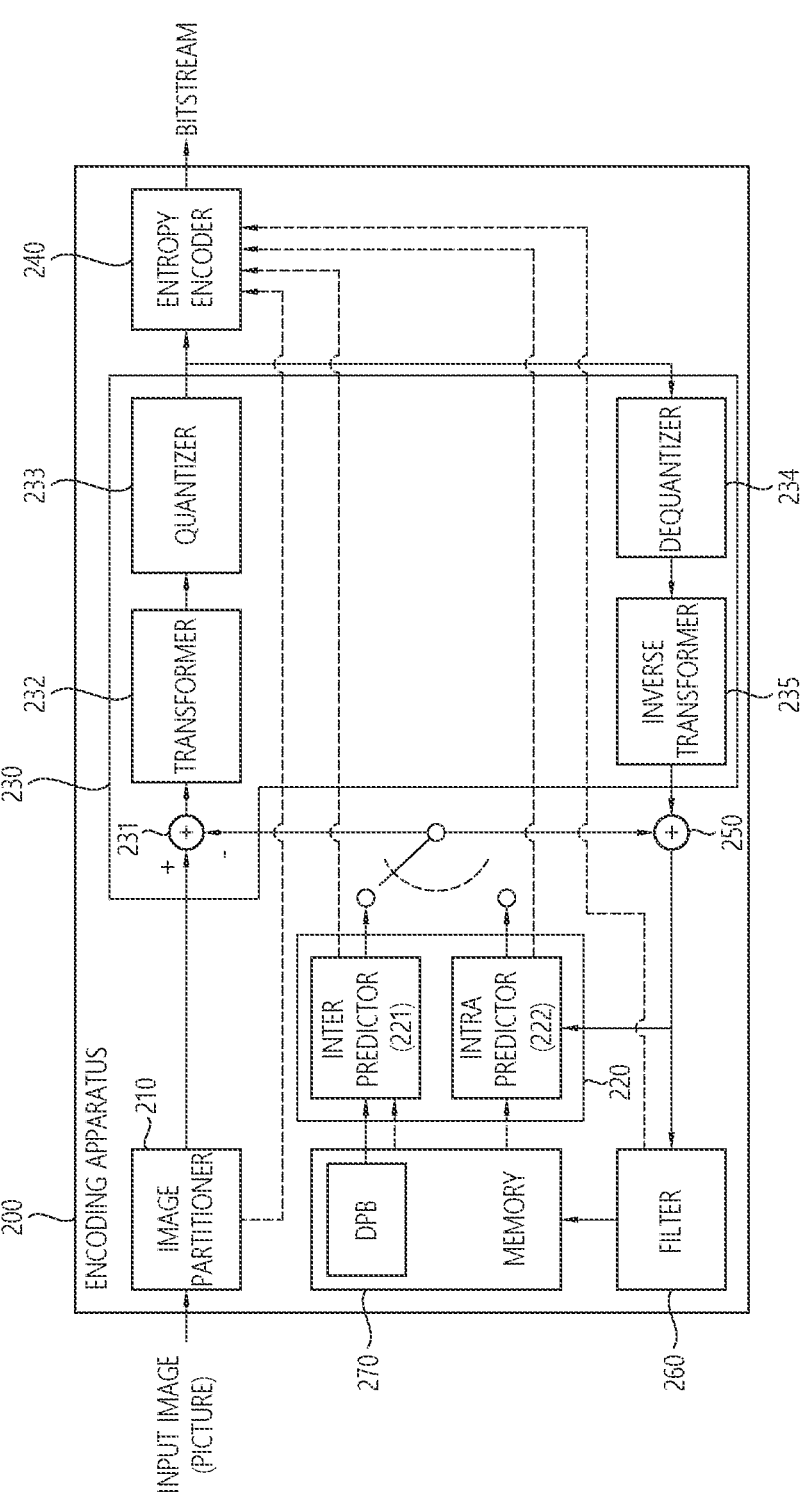
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the embodiment(s) of the present disclosure may be applied. Hereinafter, the encoding apparatus may include an image encoding apparatus and/or a video encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (e.g., an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a part for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or C U basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction. Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loéve transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form.

Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g., values of syntax elements, etc.) together or separately. Encoded information (e.g., encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
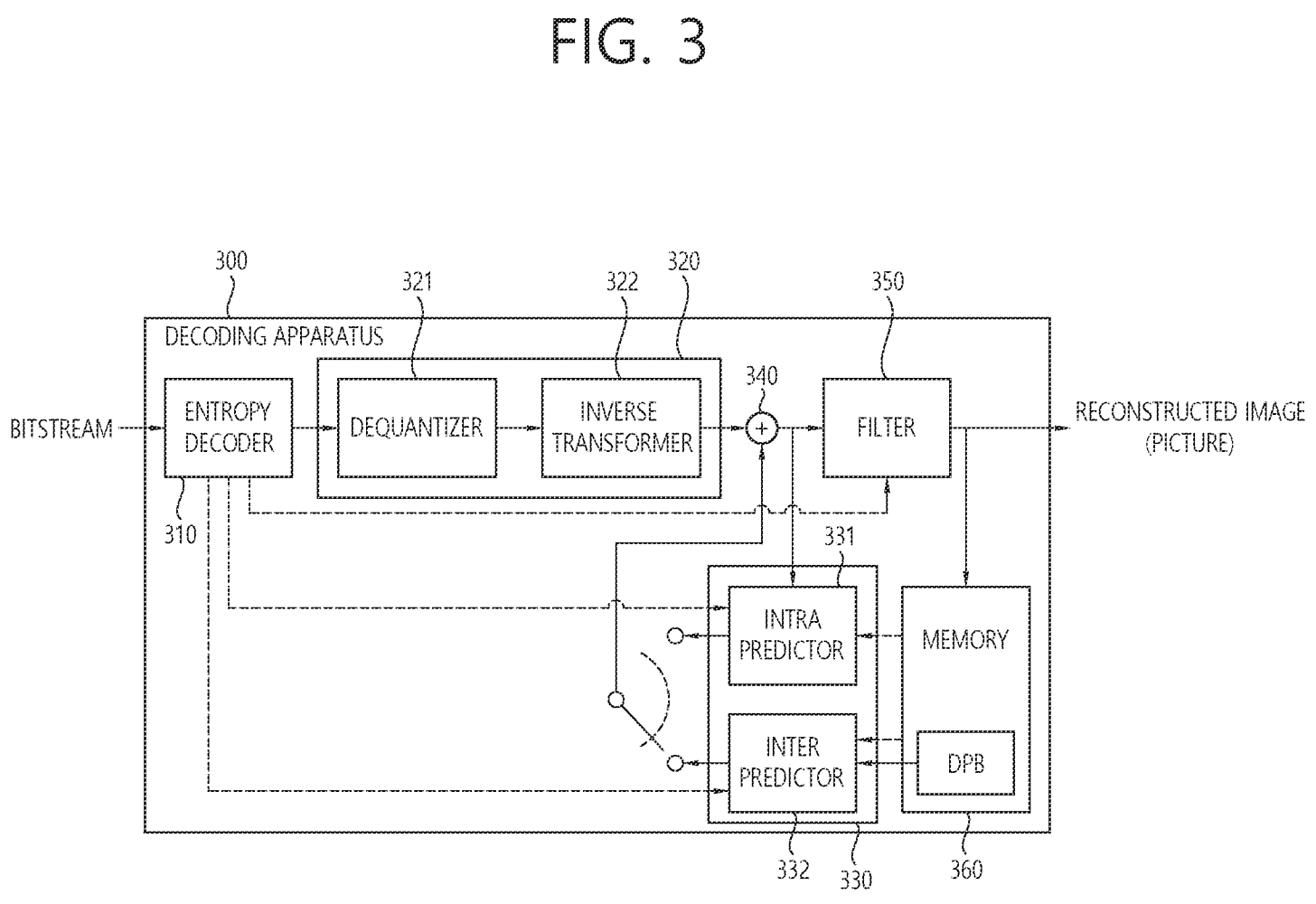

FIG. 3 is a schematic diagram illustrating a configuration of a video/image decoding apparatus to which the embodiment(s) of the present disclosure may be applied. Hereinafter, the decoding apparatus may include an image decoding apparatus and/or a video decoding apparatus.

Referring to FIG. 3, the decoding apparatus 300 may include an entropy decoder 310, a residual processor 320, a predictor 330, an adder 340, a filter 350, a memory 360. The predictor 330 may include an intra predictor 331 and an inter predictor 332. The residual processor 320 may include a dequantizer 321 and an inverse transformer 322. The entropy decoder 310, the residual processor 320, the predictor 330, the adder 340, and the filter 350 may be configured by a hardware component (e.g., A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/ bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (e.g., quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a recon-structed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified recon-structed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

Figure 4:
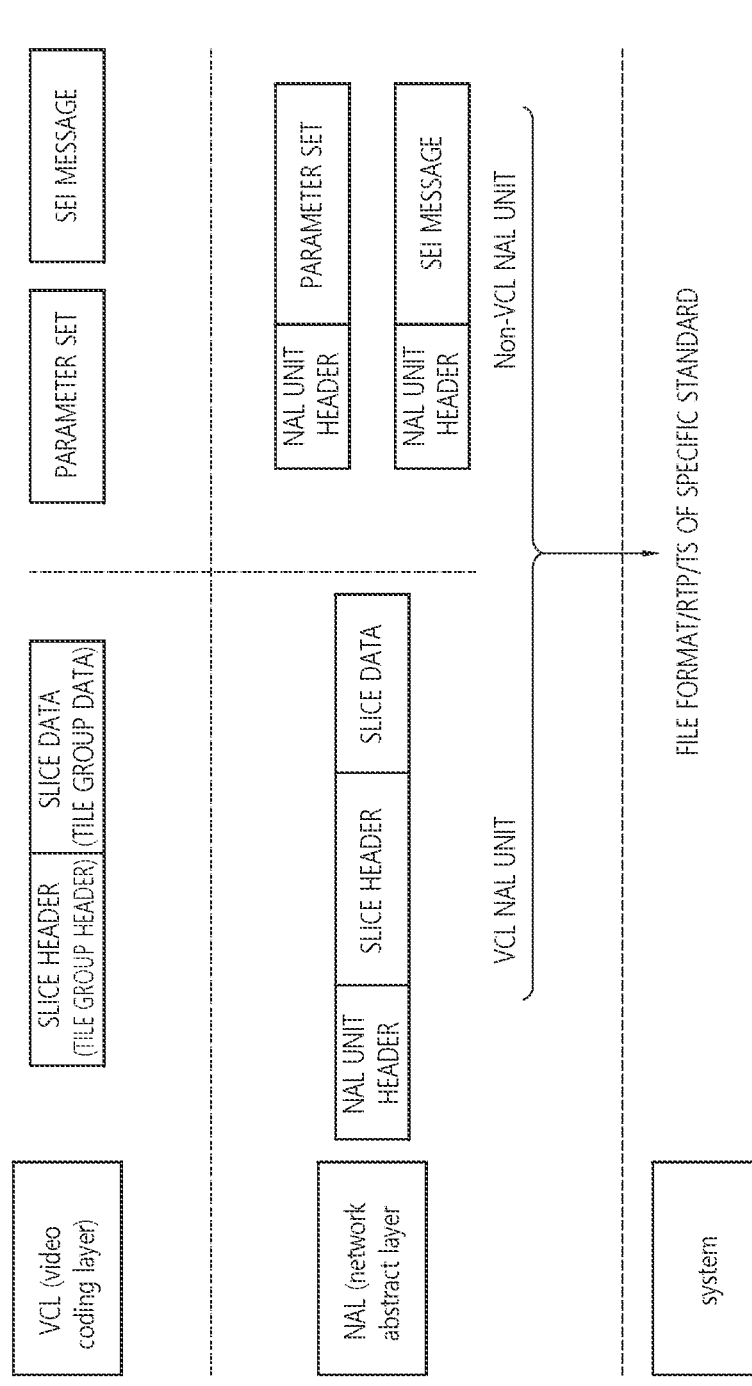
FIG. 4 exemplarily illustrates a hierarchical structure for coded video/image.

FIG. 4 exemplarily illustrates a hierarchical structure for coded video/image.

Referring to FIG. 4, a coded video/image may be divided into a video coding layer (VCL) that performs decoding processing of a video/image and handles the decoding processing, a lower system that transmits and stores coded information, and a network abstraction layer (NAL) which exists between the VCL and the lower system, and serves to perform a network adaptation function.

For example, VCL data including compressed image data (slice data), or a picture parameter set (PPS), a sequence parameter set (SPS), or a video parameter set (VPS), or a parameter set including a supplemental enhancement infor-mation (SEI) message additionally required in an image decoding process may be generated, in the VCL.

For example, in the NAL, header information (NAL unit data) is added to a raw byte sequence payload (RSRP) generated in the VCL to generate the NAL unit. In this case, the slice data, the parameter set, the SEI message, etc., generated in the VCL may be referred to, for the RBSP. The NAL unit header may include NAL unit type information specified according to RSRP data included in the corre-sponding NAL unit.

For example, as illustrated in FIG. 4, the NAL unit may be classified into a VCL NAL unit and a non-VCL NAL unit according to the RSRP generated in the VCL. The VCL NAL unit may mean a NAL unit including information (slice data) on the information, and the non-VCL NAL unit may mean a NAL unit including information (parameter set or SEI message) required to decode the image.

The VCL NA unit and the non-VCL NAL unit may be transmitted through a network while header information is added according to a data standard of a sub system. For example, the NAL unit may be converted into a data format of a predetermined standard such as an H.266/VVC file format, a real-time transport protocol (RTP), a transport stream (TS), etc., and transported through various networks.

Further, as described above, in respect to the NAL unit, a NAL unit type may be specified according to an RBSP data structure included in the corresponding NAL unit, and information on the NAL unit type may be stored in a NAL unit header and signaled.

For example, the NAL unit may be classified into a VCL NAL unit type and a non-VCL NAL unit type according to whether the NAL unit includes information (slice data) on the image. Further, the VCL NAL unit type may be classified according to a property and a type of picture included in the VCL NAL unit and the non-VCL NAL unit may be classified according to the type of parameter set.

The following is an example of the NAL unit type specified according to the type of parameter set included in the non-VCL NAL unit type.

Adaptation Parameter Set (APS) NAL unit: Type for the NAL unit including the APS Decoding Parameter Set (DPS) NAL unit: Type for the NAL unit including the DPS Video Parameter Set (VPS) NAL unit: Type for the NAL unit including the VPS Sequence Parameter Set (SPS) NAL unit: Type for the NAL unit including the SPS Picture Parameter Set (PPS) NAL unit: Type for the NAL unit including the PPS Picture header (PH) NAL unit: Type for the NAL unit including the PH The above-described NAL unit types may have syntax information for the NAL unit type and the syntax informa-tion may be stored in the NAL unit header and signaled. For example, the syntax information may be nal_unit_type and the NAL unit type may be specified as a value of nal_unit-_type.

Meanwhile, one picture may include a plurality of slices, and the slice may include a slice header and slice data. In this case, one picture header may be added for the plurality of slices (a set of the slice header and the slice data). The picture header (picture header syntax) may include infor-mation/parameters which may be commonly applied to a picture. The slice header (slice header syntax) may include information/parameters which may be commonly applied to a slice. APS (ASP syntax) or PPS (PPS syntax) may include information/parameters which may be commonly applied to one or more slices or pictures. SPS (SPS syntax) may include information/parameters which may be commonly applied to one or more sequences. VPS (VPS syntax) may include information/parameters which may be commonly applied to a plurality of layers. DPS (DPS syntax) may include information/parameters which may be commonly applied to an overall image. The DPS may include infor-mation/parameter related to concatenation of a coded video sequence (CVS).

In the present disclosure, the image/video information encoded from the encoding apparatus to the decoding appa-ratus and signaled in the form of the bitstream may include intra-picture partitioning related information, intra/inter pre-diction information, interlayer prediction related informa-tion, residual information, and in-loop filtering information, and may include information included in the APS, informa-tion included in the PPS, information included in the SPS, information included in the VPS, and/or information included in the DPS. Further, the image/video information may further include information of the NAL unit header.

Meanwhile, as described above, in performing video coding, prediction is performed to increase compression efficiency. A predicted block including prediction samples for the current block, that is, the coding target block, may be generated through the prediction. Here, the predicted block includes the prediction samples in a spatial domain (or pixel domain). The predicted block is identically derived in the encoding apparatus and the decoding apparatus. The encoding apparatus may enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). Here, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

In the present disclosure, at least one of the quantization/the dequantization and/or the transform/the inverse transform may be omitted. If the quantization/dequantization is omitted, the quantized transform coefficient may be referred to as a transform coefficient. If the transform/the inverse transform are omitted, the transform coefficient may also be referred to as a coefficient or a residual coefficient, or for unity of expression, also be still referred to as the transform coefficient. In addition, whether or not the transform/inverse transform is omitted may be signaled based on transform_skip_flag.

In the present disclosure, the quantized transform coefficient and the transform coefficient may be referred to as a transform coefficient and a scaled transform coefficient, respectively. In this case, the residual information may include information about the transform coefficient(s), and the information about the transform coefficient(s) may be signaled through a residual coding syntax. The transform coefficients may be derived based on the residual information (or the information about the transform coefficient(s)), and the scaled transform coefficients may be derived through the inverse transform (scaling) for the transform coefficients. The residual samples may be derived based on the inverse transform (transform) for the scaled transform coefficients. This may be likewise applied to/expressed in other parts of the present disclosure.

Meanwhile, as described above, the intra prediction or inter prediction may be applied when performing the prediction on the current block. Hereinafter, a case of applying the inter prediction to the current block will be described.

The predictor (more specifically, inter predictor) of the encoding/decoding apparatus may derive prediction samples by performing the inter prediction in units of the block. The inter prediction may represent prediction derived by a method dependent to the data elements (e.g., sample values or motion information) of a picture(s) other than the current picture. When the inter prediction is applied to the current block, a predicted block (prediction sample array) for the current block may be derived based on a reference block (reference sample array) specified by the motion vector on the reference picture indicated by the reference picture index. In this case, in order to reduce an amount of motion information transmitted in the inter-prediction mode, the motion information of the current block may be predicted in units of a block, a subblock, or a sample based on a correlation of the motion information between the neighboring block and the current block. The motion information may include the motion vector and the reference picture index. The motion information may further include inter-prediction type (L0 prediction, L1 prediction, Bi prediction, etc.) information. In the case of applying the inter prediction, the neighboring block may include a spatial neighboring block which is present in the current picture and a temporal neighboring block which is present in the reference picture. A reference picture including the reference block and a reference picture including the temporal neighboring block may be the same as each other or different from each other. The temporal neighboring block may be referred to as a name such as a collocated reference block, a collocated CU (colCU), etc., and the reference picture including the temporal neighboring block may be referred to as a collocated picture (colPic). For example, a motion information candidate list may be configured based on the neighboring blocks of the current block and a flag or index information indicating which candidate is selected (used) may be signaled in order to derive the motion vector and/or reference picture index of the current block. The inter prediction may be performed based on various prediction modes and for example, in the case of a skip mode and a merge mode, the motion information of the current block may be the same as the motion information of the selected neighboring block. In the case of the skip mode, the residual signal may not be transmitted unlike the merge mode. In the case of a motion vector prediction (MVP) mode, the motion vector of the selected neighboring block may be used as a motion vector predictor and a motion vector difference may be signaled. In this case, the motion vector of the current block may be derived by using a sum of the motion vector predictor and the motion vector difference.

The motion information may further include L0 motion information and/or L1 motion information according to the inter-prediction type (L0 prediction, L1 prediction, Bi prediction, etc.). A L0-direction motion vector may be referred to as an L0 motion vector or MVL0 and an L1-direction motion vector may be referred to as an L1 motion vector or MVL1. A prediction based on the L0 motion vector may be referred to as an L0 prediction, a prediction based on the L1 motion vector may be referred to as an L1 prediction, and a prediction based on both the L0 motion vector and the L1 motion vector may be referred to as a bi-prediction. Here, the L0 motion vector may indicate a motion vector associated with a reference picture list L0 and the L1 motion vector may indicate a motion vector associated with a reference picture list L1. The reference picture list L0 may include pictures prior to the current picture in an output order and the reference picture list L1 may include pictures subsequent to the current picture in the output order, as the reference pictures. The prior pictures may be referred to as a forward (reference) picture and the subsequent pictures may be referred to as a reverse (reference) picture. The reference picture list L0 may further include the pictures subsequent to the current picture in the output order as the reference pictures. In this case, the prior pictures may be first indexed in the reference picture list L0 and the subsequent pictures may then be indexed. The reference picture list L1 may further include the pictures prior to the current picture in the output order as the reference pictures. In this case, the subsequent pictures may be first indexed in the reference picture list L1 and the prior pictures may then be indexed. Here, the output order may correspond to a picture order count (POC) order.

Further, various inter prediction modes may be used in applying the inter prediction to the current block. For example, various modes including a merge mode, a skip mode, a motion vector prediction (MVP) mode, an affine mode, a historical motion vector prediction (HMVP) mode, and the like may be used. A decoder side motion vector refinement (DMVR) mode, an adaptive motion vector resolution (AMVR) mode, a bi-directional optical flow (BDOF) etc., may be further used as an ancillary mode. The affine mode may be referred to as an affine motion prediction mode. The MVP mode may be referred to as an advanced motion vector prediction (AMVP) mode. In this document, some modes and/or motion information candidates derived by some modes may be included in one of motion information related candidates of other modes.

The prediction mode information indicating the inter prediction mode of the current block may be signaled from the encoding apparatus to the decoding apparatus. In this case, the prediction mode information may be included in the bitstream and received by the decoding apparatus. The prediction mode information may include index information indicating one of multiple candidate modes. Alternatively, the inter prediction mode may be indicated through a hierarchical signaling of flag information. In this case, the prediction mode information may include one or more flags. For example, whether to apply the skip mode may be indicated by signaling a skip flag, whether to apply the merge mode may be indicated by signaling a merge flag when the skip mode is not applied, and it is indicated that the MVP mode is applied or a flag for additional distinguishing may be further signaled when the merge mode is not applied. The affine mode may be signaled as an independent mode or signaled as a dependent mode on the merge mode or the MVP mode. For example, the affine mode may include an affine merge mode and an affine MVP mode.

Further, the motion information of the current block may be used in applying the inter prediction to the current block. The encoding apparatus may derive optimal motion information for the current block through a motion estimation procedure. For example, the encoding apparatus may search a similar reference block having a high correlation in units of a fractional pixel within a predetermined search range in the reference picture by using an original block in an original picture for the current block and derive the motion information through the searched reference block. The similarity of the block may be derived based on a difference of phase based sample values. For example, the similarity of the block may be calculated based on a sum of absolute differences (SAD) between the current block (or a template of the current block) and the reference block (or the template of the reference block). In this case, the motion information may be derived based on a reference block having a smallest SAD in a search area. The derived motion information may be signaled to the decoding apparatus according to various methods based on the inter prediction mode.

A predicted block for the current block may be derived based on the motion information derived according to the inter prediction mode. The predicted block may include prediction samples (prediction sample array) of the current block. When the motion vector (MV) of the current block indicates a fractional sample unit, an interpolation procedure may be performed and the prediction samples of the current block may be derived based on reference samples of the fractional sample unit in the reference picture through the interpolation procedure. When the affine inter prediction is applied to the current block, the prediction samples may be generated based on a sample/subblock-unit MV. When the bi-prediction is applied, prediction samples derived through a weighted sum or a weighted average (according to a phase) of prediction samples derived based on the L0 prediction (i.e., a prediction using a reference picture in the reference picture list L0 and MVL0) and prediction samples derived based on the L1 prediction (i.e., a prediction using a reference picture in the reference picture list L1 and MVL1) may be used as the prediction samples of the current block. When the bi-prediction is applied, if the reference picture used for the L0 prediction and the reference picture used for the L1 prediction are located in different temporal directions based on the current picture (i.e., if the prediction corresponds to the bi-prediction and the bi-directional prediction), this may be referred to as a true bi-prediction.

Reconstructed samples and reconstructed pictures may be generated based on the derived prediction samples and thereafter, the procedure such as in-loop filtering, etc., may be performed as described above.

Meanwhile, since the motion of the current block is predicted based on the motion vector of the neighboring block without a motion vector difference (MVD) in the skip mode and/or the merge mode, the skip mode and/or the merge mode shows a limitation in a motion prediction. In order to improve the limitation of the skip mode and/or the merge mode, the motion vector may be refined by applying a Decoder-side Motion Vector Refinement (DMVR) mode, a Bi-directional optical flow (BDOF) mode, etc. The DMVR and BDOF modes may be used when the true bi-prediction is applied to the current block.

Figure 5:
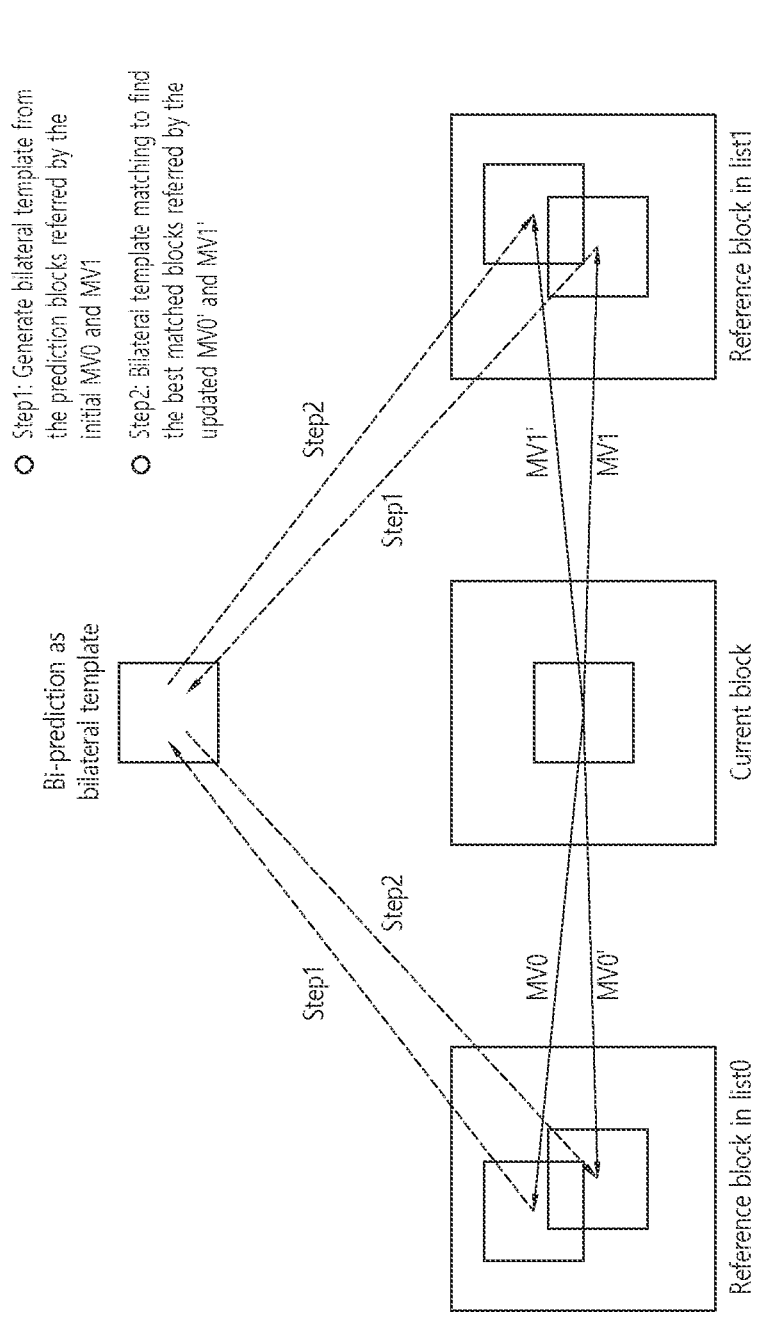
FIG. 5 is a diagram for describing an embodiment of a process of performing a Decoder-side Motion Vector Refinement (DMVR).

FIG. 5 is a diagram for describing an embodiment of a process of performing a Decoder-side Motion Vector Refinement (DMVR).

The DMVR is a method in which the decoder performs the motion prediction by refining the motion information of the neighboring block. When the DMVR is applied, the decoder may derive the refined motion information through cost comparison based on a template generated by using the motion information of the neighboring block in the merge/skip mode. In this case, precision of the motion prediction may be increased and compression performance may be enhanced without additional signaling information.

In this disclosure, for convenience of description, the decoding apparatus is mainly described, but the DMVR according to the embodiment of this disclosure may be performed in the same method even in the encoding apparatus.

Referring to FIG. 5, the decoding apparatus may derive prediction blocks (i.e., reference blocks) identified by list0 and list1-direction initial motion vectors (or motion information) (e.g., MV0 and MV1) and generate a template (or a bilateral template) by a weighted sum (e.g., averaging) of the derived prediction samples (step 1). Here, the initial motion vectors (MV0 and MV1) may represent motion vectors derived by using the motion information of the neighboring block in the merge/skip mode.

In addition, the decoding apparatus may derive motion vectors (e.g., MV0' and MV1') for minimizing a difference between the template and the sample area of the reference picture through a template matching operation (step 2). Here, the sample area may indicate a neighboring area of an initial prediction block in the reference picture and the sample area may be referred to as the neighboring area, a reference area, a search area, a search range, a search space, etc. The template matching operation may include an operation of calculating a cost measurement value between the template and the sample area of the reference picture. For example, the sum of absolute differences (SAD) may be used for the cost measurement. As one example, as a cost function, the normalized SAD may be used. In this case, matching cost may be given as SAD(T−mean(T), 2*P[x]−2*mean(P[x])). Here, T represents the template and P[x] represents the block in the search area. In addition, a motion vector for calculating minimum template cost for each of two reference pictures may be considered as an updated motion vector (replacing the initial motion vector). As illustrated in FIG. 5, the decoding apparatus may generate a final bilateral prediction result (i.e. a final bilateral prediction block) by using the updated motion vectors MV0' and MV1'. As an embodiment, multi-iteration for deriving the updated (or new) motion vector may be used for acquiring the final bilateral prediction result.

In an embodiment, the decoding apparatus may call a DMVR process in order to enhance accuracy of an initial motion compensation prediction (i.e., the motion compensation prediction through the conventional merge/skip mode). For example, the decoding apparatus may perform the DMVR process when the prediction mode of the current block is the merge mode or the skip mode and the bilateral bi-prediction in which the bilateral reference pictures are located at opposite directions based on the current picture in a display order is applied to the current block.

Figure 6:
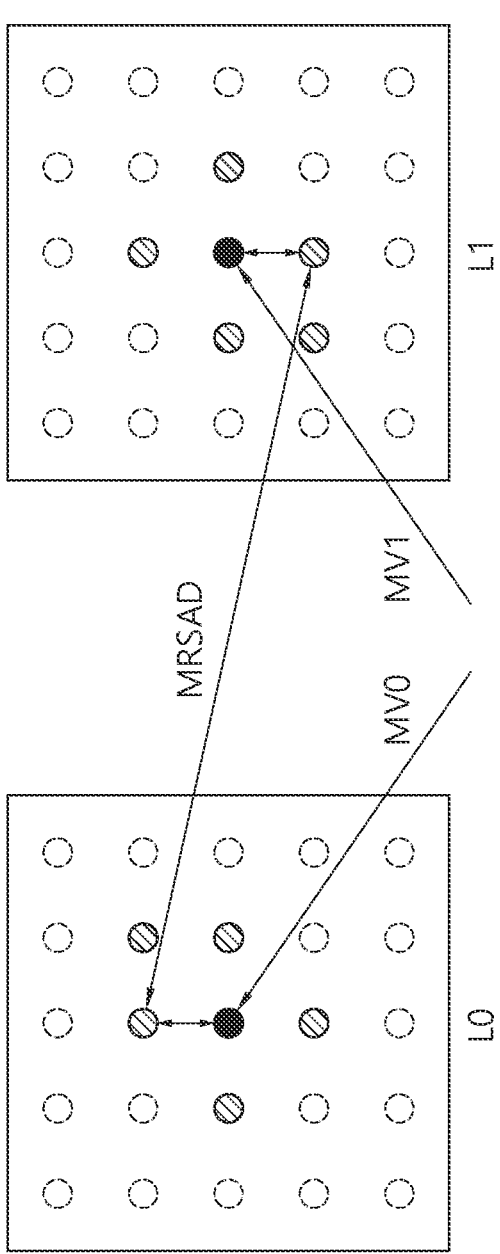
FIG. 6 is a diagram for describing an embodiment of a process of performing a decoder-side motion vector refinement (DMVR) by using a sum of absolute differences (SAD).

FIG. 6 is a diagram for describing an embodiment of a process of performing a decoder-side motion vector refinement (DMVR) by using a sum of absolute differences (SAD).

As described above, the decoding apparatus may measure matching cost by using the SAD in performing the DMVR. As an embodiment, in FIG. 6, a method for refining the motion vector by calculating a mean sum of absolute difference (MRSAD) between the prediction samples in two reference pictures without generating the template will be described. In other words, the method of FIG. 6 shows an embodiment of bilateral matching using the MRSAD.

Referring to FIG. 6, the decoding apparatus may derive an adjacent pixel of a pixel (sample) indicated by the list0 (L0) direction motion vector MV0 on the L0 reference picture and derive an adjacent pixel of a pixel (sample) indicated by the list1 (L1) direction motion vector MV1 on the L1 reference picture. In addition, the decoding apparatus may measure the matching cost by calculating the MRSAD between the L0 prediction block (i.e., L0 reference block) identified by the motion vector indicating the adjacent pixel derived on the L0 reference picture and the L1 prediction block (i.e., L1 reference block) identified by the motion vector indicating the adjacent pixel derived on the L1 reference picture. In this case, the decoding apparatus may select a search point (i.e., a search area having the minimum SAD between the L0 prediction block and the L1 prediction block) having minimum cost as a refined motion vector pair. In other words, the refined motion vector pair may include a refined L0 motion vector indicating a pixel position (L0 prediction block) having the minimum cost in the L0 reference picture and a refined L1 motion vector indicating a pixel position (L1 prediction block) having the minimum cost in the L reference picture.

As an embodiment, in calculating the matching cost, after the search area of the reference picture is set, a unilateral prediction may be performed by using a regular 8 tap DCTIF interpolation filter. Further, as one example, 16-bit precision may be used for calculation of the MRSAD and clipping and/or rounding operations may not be applied before the calculation of the MRSAD by considering an internal buffer.

When the true bi-prediction is applied to the current block as described above, the BDOF may be used in order to refine a bi-prediction signal. When the bi-prediction is applied to the current block, the bi-directional optical flow (BDOF) may be used to calculate improved motion information and generate the prediction samples based on the calculated motion information. For example, the BDOF may be applied at a 4×4 subblock level. In other words, the BDOF may be performed in units of 4×4 subblocks in the current block. Alternatively, the BDOF may be applied only to a luma component. Alternatively, the BDOF may be applied only to a chroma component and applied to the luma component and the chroma component.

The BDOF mode is based on an optical flow concept assuming that an object motion is smooth as indicated by a name of the BDOF mode. A motion refinement $(v_x, v_y)$ may be calculated by minimizing a difference value between the L0 and L1 prediction samples for each of 4×4 subblocks. In addition, the motion refinement may be used for adjusting the bi-prediction sample values in 4×4 subblocks.

It can be seen that the DMVR and the BDOF are techniques that perform the prediction by refining the motion information when applying the true bi-prediction (in this case, the true bi-prediction represents a case of performing the motion prediction/compensation in a reference picture of a different direction based on the picture of the current block), and are a refinement technique with a similar concept in that it is assumed that the motion of an object in the picture is made at a predetermined speed and in a predetermined direction.

Meanwhile, the following describes structures and features that may be used to determine/parse inter mode(s) and/or inter prediction(s) in the decoder in order to improve the performance of the inter coding structure. The described method(s) are based on Versatile Video Coding (VVC), but may also be applied to other past or future video coding technologies.

In this document, multi-pass DMVR technology may be applied to improve inter coding performance. The multi-pass DMVR (i.e., MDMVR) is a technology to further improve (and simplify) the technology of DMVR in next-generation video codecs. In the first pass, bilateral matching (BM) may be applied to a coding block, and in the second pass, BM may be applied to each 16×16 subblock in the coding block, and in the third pass, BDOF may be applied to refine the MV of each 8×8 subblock. Here, the refined MV may be stored for spatial and temporal motion vector prediction.

Referring more specifically to multi-pass DMVR in the first pass of MDMVR, a refined MV may be derived by applying BM (bilateral matching) to the coding block. Similar to Decoder-Side Motion Vector Refinement (DMVR), in bi-prediction operation, the refined MV may be searched around the two initial MVs (MV0 and MV1) in the reference picture lists L0 and L1. The refined MVs (MV0_pass1 and MV1_pass1) may be derived around the initial MVs based on the minimum bilateral matching cost between two reference blocks in L0 and L1.

The BM may perform a local search to derive integer sample precision intDeltaMV. The local search may apply a 3×3 square search pattern to loop through the search range [−sHor, sHor] in horizontal direction and [−sVer, sVer] in vertical direction. Here, the values of sHor and sVer are determined by the block dimension, and the maximum value of sHor and sVer may be 8.

The bilateral matching cost may be calculated as bilCost=mvDistanceCost+sadCost. When the block size cbW*cbH is greater than 64, the MRSAD cost function may be applied to remove the DC distortion effect between reference blocks. When the bilCost at the center point of the 3×3 search pattern has the minimum cost, the intDeltaMV local search may be terminated. Otherwise, the current minimum cost search point becomes the new center point of the 3×3 search pattern and search for the minimum cost may continue, until it reaches the end of the search range.

The existing fractional sample refinement may be further applied to derive the final deltaMV. The refined MVs after the first pass may be derived as follows.

$$MV0\_pass1=MV0+deltaMV$$

$$MV1\_pass1=MV1-deltaMV$$

In the second pass of MDMVR, a refined MV may be derived by applying BM to a 16×16 grid subblock. For each subblock, a refined MV may be searched around the two MVs (MV0_pass1, MV1_pass1) obtained in the first pass in the reference picture lists L0 and L1. The refined MVs (MV0_pass2(sbIdx2) and MV1_pass2(sbIdx2)) may be derived based on the minimum bilateral matching cost between two reference subblocks in L0 and L1.

For each subblock, BM may perform a full search to derive integer sample precision intDeltaMV. The full search has a search range of [−sHor, sHor] in the horizontal direction and a search range of [−sVer, sVer] in the vertical direction, wherein the values of sHor and sVer are determined by the block dimension, and the maximum value of sHor and sVer may be 8.

The bilateral matching cost may be calculated by applying a cost factor to the SATD cost between two reference subblocks, such as bilCost=satdCost*costFactor. The search area (2*sHor+1)*(2*sVer+1) may be divided into up to 5 diamond-shaped search regions. Each search region is assigned a costFactor, which is determined by the distance (intDeltaMV) between each search point and the starting MV, and each diamond region may be processed in order starting from the center of the search area. In each region, search points may be processed in raster scan order starting from the top left going to the bottom right corner of the region. When the minimum bilCost within the current search region is less than a threshold equal to sbW*sbH, the int-pel full search may be terminated, otherwise the int-pel full search may continue to the next search region until all search points have been examined.

In existing VVC, DMVR fractional sample refinement may be further applied to derive the final deltaMV (sbIdx2). The refined MVs at the second pass can be derived as follows.

$$MV0\_pass2(sbIdx2) = MV0\_pass1 + deltaMV(sbIdx2)$$

$$MV1\_pass2(sbIdx2) = MV1\_pass1 - deltaMV(sbIdx2)$$

In the third pass of MDMVR, a refined MV may be derived by applying BDOF to an 8×8 grid subblock. For each 8×8 subblock, BDOF refinement may be applied to derive the scaled Vx and Vy without clipping, starting from the refined MV of the parent subblock in the second pass. The derived bioMv(Vx, Vy) may be rounded to $\frac{1}{16}$ sample precision and clipped between −32 and 32.

The refined MVs (MV0_pass3(sbIdx3) and MV1_pass3 (sbIdx3)) at the third pass may be derived as follows.

$$MV0\_pass3(sbIdx3) = MV0\_pass2(sbIdx2) + bioMv$$

$$MV1\_pass3(sbIdx3) = MV0\_pass2(sbIdx2) - bioMv$$

Meanwhile, the present disclosure proposes a method that improves the performance of the inter coding structure and does not increase the processing complexity when applying Decoder-Side Motion Vector Derivation (DMVD) (i.e., DMVR and/or multi-pass DMVR) as described above. For this purpose, the following aspects may be considered. That is, the proposed method may include the following embodiments, and the proposed embodiments may be applied individually or in combination.

1. As an example, DMVR may be applied in multiple levels or in multiple passes or multiple stages to derive the final refined motion vector. For the purposes of this disclosure, multi-layer DMVR may be referred to as MDMVR. In addition, multiple layers may also be referred to as multiple passes, multiple levels, or multiple stages.

2. In addition, as an example, the use of MDMVR may be determined by considering several factors:

a. Each CU may have a varying number of layers. For example, the current PU may have 2 layers, and the next PU may require 3 layers.

b. It may be possible to use the MVD information to determine whether DMVR is applied to a block or how many levels or layers of DMVR that may be applied.

i) For example, in the first case (i.e., use for on/off control of DMVR), if the MVD in merge mode exceeds a predetermined threshold, it may be possible to not apply DMVR For example, the threshold may be chosen in units of $\frac{1}{4}$-pel, $\frac{1}{2}$-pel, 1-pel, 4-pel, and/or other appropriate MVD units.

ii) For example, if for a particular block size(s), any of the threshold(s) is not satisfied, then DMVR may not be applied.

iii) Alternately, it may also be possible to use these thresholds to determine whether a single layer, two layers, or multiple layers need to be applied to the DMVR. For example, if the MVD is within the limits of certain thresholds, it may be sufficient to perform DMVR at the 16×16 level rather than the 8×8 level.

3. In addition, as an example, when performing MDMVR, each layer may have the same search pattern or a different search pattern.

4. In addition, as an example, the search point may typically differ depending on the search pattern. Therefore, it may be possible and beneficial to initially use a larger search which correlates with more search points, and then in later layers reduce the search space by considering smaller search patterns and lower number of search points.

5. Additionally, the accuracy of the initial search pattern may be integer-based and the additional layer accuracy may be ½-pel or ¼-pel.

6. In addition, as an example, the search patterns considered may include, but are not limited to squares, diamonds, crosses, rectangles, and/or other appropriate shapes to capture the underlying motion of the block.
a. For example, if the motion vector in the x-direction is larger than the motion vector in the y-direction, a rectangular search pattern may be useful as it may be more appropriate in capturing the underlying motion of the block.
b. Alternatively, a diamond/cross shape may be more appropriate with blocks that have more vertical motion.

7. In addition, as an example, the size of the search region may be different for each block depending on the size of the block.
a. For example, it may be possible to use 7×7/8×8, or larger, or other appropriate square/diamond search pattern if larger blocks are used. This may be used in conjunction with variable DMVR granularity.
b. Alternatively, if the blocks are smaller, the search area may be made smaller than 5×5.
c. It may also be possible to determine the size of the search region based on the underlying motion information and motion characteristics of available neighboring blocks. For example, if the block MVD is greater than a threshold T (which may be predetermined), a 7×7 search region may be used.

8. In addition, as an example, it may be possible for the reference samples to be pre-fetch and stored in memory while waiting for processing. For example, when samples are pre-fetched, the samples may be reference sample padded.

9. In VVC, DMVR uses SAD as the means to evaluate the refined MV using an iterative process. However, it may be possible to use several other distortion metrics to evaluate distortion.
a. For example, an L0 norm may be used, where the initial and intermediate motion vectors may be used to determine whether there has been a change of motion in the x or y direction. This may then be used to evaluate whether early termination may be achieved.
b. Alternatively, for example, other forms of the norm such as the Euclidean Norm (L2) may be used to indicate the which of the points has the largest displacement, thus indicating an outlier.
c. In addition, for example, it may be possible to use MR-SAD (Mean Removed-Sum of Absolute Difference). Several variations of MR-SAD may also be used. For example, MRSAD of every alternate row/column or MRSAD of the previous block of cumulative average per block may be used.

10. In addition, as an example, it may be possible to add additional weighting factors to attenuate/amplify any of the distortion measures. These considerations may be taken into account if the distortion of a particular search point has to be prioritized over other search points.
a. For example, if the initial search point has to be prioritized over other points in the search range, a weight to the initial error/distortion metric could be applied, such that the initial value(s) would result in the minimum distortion cost.
b. As another example, it may be possible to consider available motion information of neighboring blocks to determine the weight to be used.

11. In addition, as an example, it may be possible to facilitate early termination within a single layer or within each layer of MDMVR.
a. For example, MDMVR may be terminated early if the distance between the initial starting MV and the MV at a point during the iteration is less than a threshold T, then the search may be terminated.
b. Alternatively, any termination conditions may be checked between layers. For example, the CU may signal to use three layers for DMVR. However, DMVR can be terminated if the termination condition is satisfied after the first layer.
c. Alternatively, other early termination methodologies such sample-based differences or SAD-based differences, may also be used either as individual checks or as in combinations.

12. In addition, as an example, the use of a single layer DMVR or MDMVR may be signaled in several parameter sets.
a. For example, the use of MDMVR may be fixed for the entire sequence by signaling a single flag in the SPS with related GCI flag.
b. It may be possible for the sequence to switch between DMVR and MDMVR at a Picture Parameter Set (PPS)/Picture header (PH)/Slice header (SH)/Coding unit (CU) and/or other appropriate headers.
i) For example, the use of an existing DMVR or MDMVR may be signaled at the PPS with additional controls present in the PH or lower level.
ii) For example, it may be possible to switch between DMVR and MDMVR at a CU level. That is, each CU may be switched independently.
c. It may be possible to consider that when a flag at an SPS, or a PTL flag, i.e., a GCI constraint flag, is signaled, it may be fixed length coded.
d. If syntax elements for MDMVR are signaled at the PPS or lower level, then it may be appropriate to use context coding to signal the necessary details.
i) For example, information that may be signaled may include, but is not limited to the number of layers, the granularity of applying MDMVR, whether early termination is used explicitly, etc.
ii) Additionally, for example, the number of context models, their initialization values may be determined considering relevant aspects of block statistics.

Meanwhile, the use of multi-layer DMVR (i.e., MDMVR) as described above may be considered beneficial to the improvement of video quality through compression efficiency. Accordingly, the present disclosure proposes a method for efficiently signaling information related to the use of MDMVR. In this regard, as an example of a structure that may be performed at the decoder, it may operate as shown in FIGS. 7 and 8.

Figure 7:
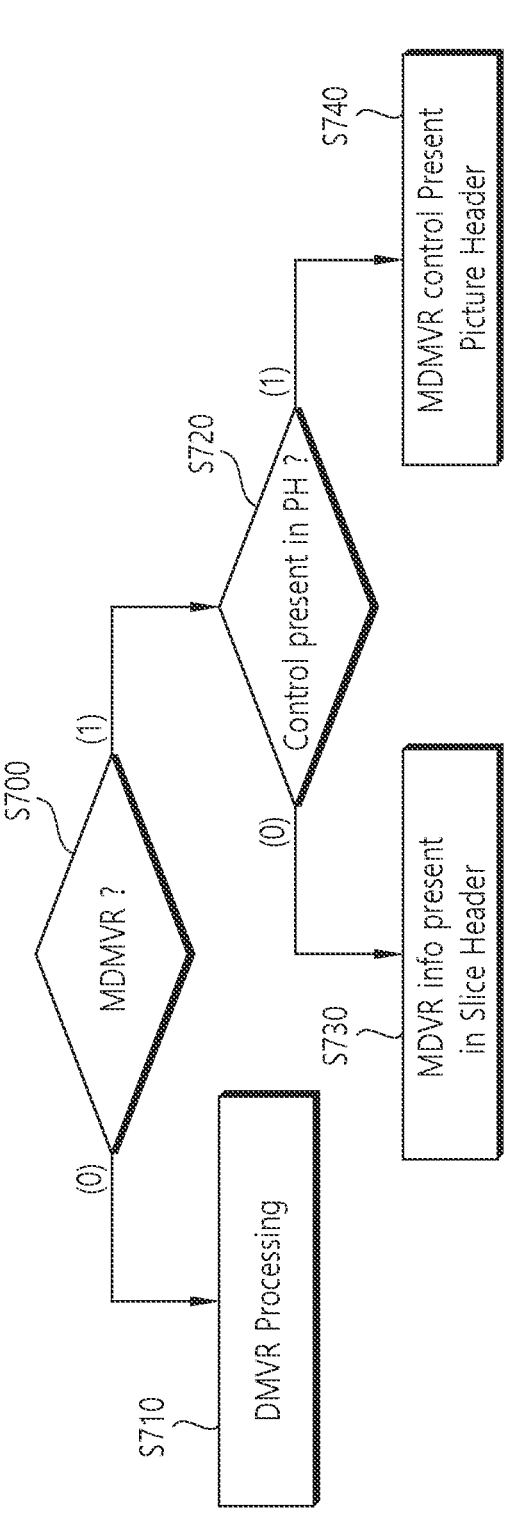
FIG. 7 exemplarily shows an MDMVR structure according to an embodiment of the present disclosure.
Figure 8:
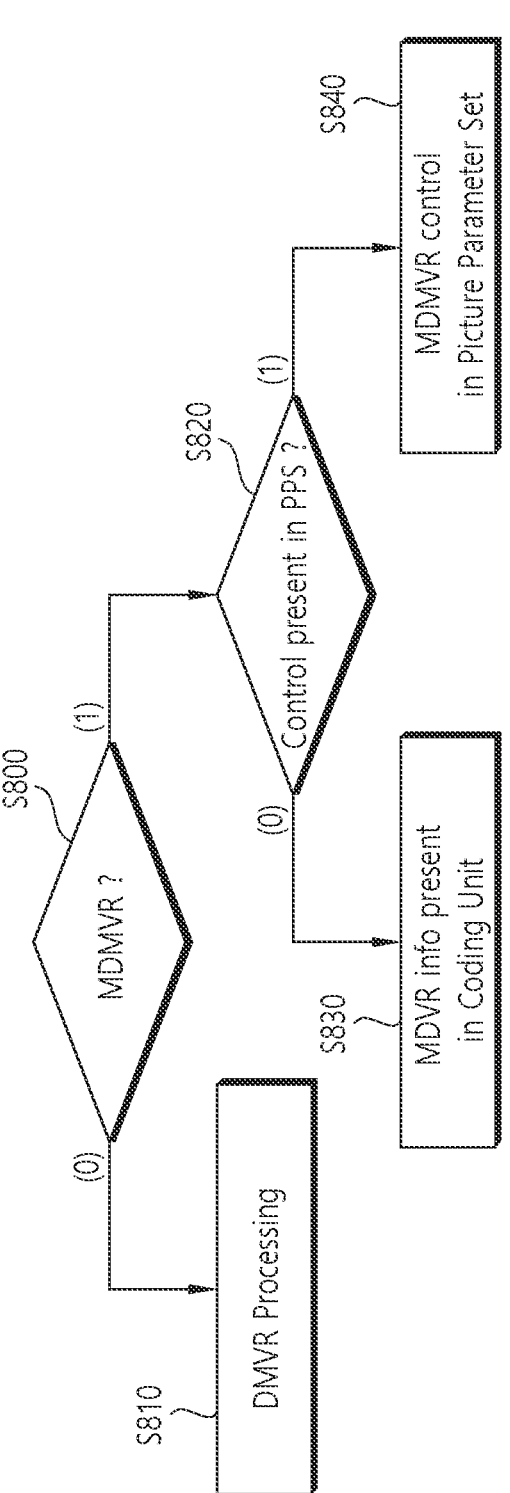
FIG. 8 exemplarily shows an MDMVR structure according to another embodiment of the present disclosure.

FIG. 7 exemplarily shows an MDMVR structure according to an embodiment of the present disclosure.

In the example of FIG. 7, a flag/index may be used to determine whether MDMVR or the existing DMVR is used (S700). Typically, such a flag (single bin or multiple fixed length coded bins) may be used to indicate whether DMVR is used (e.g., index 0), whether single layer DMVR is used (i.e., index 1) or whether both single and MDMVR are used (e.g., index 2). For example, if the existing DMVR is used, the existing DMVR processing is performed (S710). If MDMVR is used, additional control information may be signaled in the slice header or picture header (S720 to S740).

More specifically, the decoding apparatus may obtain information related to whether MDMVR is used (e.g., MDMVR enable flag or index information) and determine whether DMVR or MDMVR is used based on the information (S700). The information related to whether the MDMVR is used may be information indicating whether the MDMVR is enabled, and may be signaled in a higher level (e.g., SPS) syntax.

For example, the decoding apparatus may obtain flag information related to whether MDMVR is used, determine that DMVR is used if the value of the flag information is 0, and determine that MDMVR is used if the value of the flag information is 1.

Alternatively, for example, the decoding apparatus may obtain index information related to whether MDMVR is used and determine the use of DMVR or MDMVR based on the value of the index information. For example, if the value of the index information is 0, it may be determined that DMVR is used, and if the value of the index information is 1, it may be determined that MDMVR is used. Alternatively, as described above, if the value of the index information is 0, it may be determined that DMVR is used, if the value of the index information is 1, it may be determined that a single layer DMVR is used, and if the value of the index information is 2, it may be determined that a multi-layer DMVR (i.e., MDMVR) is used.

If the decoding apparatus determines that DMVR is used based on the information related to whether MDMVR is used, the decoding apparatus may perform DMVR (S710).

If the decoding apparatus determines that MDMVR is used based on the information related to whether MDMVR is used, the decoding apparatus may obtain additional control information (S720).

The additional control information may be MDMVR-related control information at a lower level (e.g., picture header, slice header, etc.), and may indicate, for example, whether MDMVR-related syntax elements are present in the picture header syntax. For example, if the value of the additional control information is 0, it may indicate that the additional control information (e.g., MDMVR-related syntax elements) is not present in the picture header syntax, and if the value of the additional control information is 1, it may indicate that the additional control information (e.g., MDMVR-related syntax elements) is present in the picture header syntax.

If the value of the additional control information is 0, the decoding apparatus may determine that the MDMVR-related additional control information is not present in the picture header syntax and may obtain MDMVR-related information in the slice header (S730).

The MDMVR-related information in the slice header may indicate whether MDMVR-related syntax elements are present in the slice header. For example, if the value of the MDMVR-related information is 1, it may indicate that MDMVR-related syntax elements are present in the slice header, and then the MDMVR-related syntax elements may be signaled/parsed from the slice header.

If the value of the additional control information is 1, the decoding apparatus may determine that the MDMVR-related syntax elements are present in the picture header syntax and obtain the MDMVR-related syntax elements from the picture header (S740).

Then, the decoding apparatus may perform MDMVR based on the MDMVR-related information signaled from the picture header or slice header.

FIG. 8 exemplarily shows an MDMVR structure according to another embodiment of the present disclosure.

In the example of FIG. 8, MDMVR information may be signaled in the PPS or at CU level. DMVR may be performed at the PU level. Here, when MDMVR is enabled, additional syntax elements may be parsed from the PPS to indicate whether control elements are present in the PPS or at the CU level. Since several frames typically refer to one PPS, parsing the control information from the PPS may be less flexibility as compared to when elements are signaled in the CU. However, on the contrary, signaling at the PPS level may reduce on the signaling overhead.

As a specific example, referring to FIG. 8, the decoding apparatus may obtain information related to whether MDMVR is used (e.g., MDMVR enable flag or index information), and determine whether DMVR is used or MDMVR is used based on the information (S800). The information related to whether the MDMVR is used may be information indicating whether the MDMVR is enabled, and may be signaled in a higher level (e.g., SPS) syntax.

For example, the decoding apparatus may obtain flag information related to whether MDMVR is used, determine that DMVR is used if the value of the flag information is 0, and determine that MDMVR is used if the value of the flag information is 1.

Alternatively, for example, the decoding apparatus may obtain index information related to whether MDMVR is used and determine the use of DMVR or MDMVR based on the value of the index information. For example, if the value of the index information is 0, it may be determined that DMVR is used, and if the value of the index information is 1, it may be determined that MDMVR is used. Alternatively, as described above, if the value of the index information is 0, it may be determined that DMVR is used, if the value of the index information is 1, it may be determined that a single layer DMVR is used, and if the value of the index information is 2, it may be determined that a multi-layer DMVR (i.e., MDMVR) is used.

If the decoding apparatus determines that DMVR is used based on the information related to whether MDMVR is used, the decoding apparatus may perform DMVR (S810).

At this time, the decoding apparatus may obtain DMVR-related information signaled at the PU level and perform DMVR.

If the decoding apparatus determines that MDMVR is used based on the information related to whether MDMVR is used, the decoding apparatus may obtain additional control information (S820).

The additional control information may be MDMVR-related control information at a lower level (e.g., PPS) and, for example, may indicate whether MDMVR-related syntax elements are present in the PPS syntax. For example, if the value of the additional control information is 0, it may indicate that the additional control information (e.g., MDMVR-related syntax elements) is not present in the PPS syntax, and if the value of the additional control information is 1, the additional control information (e.g., MDMVR-related syntax elements) is present in the PPS syntax.

If the value of the additional control information is 0, the decoding apparatus may determine that the MDMVR-related additional control information is not present in the PPS syntax and may obtain MDMVR-related information in the CU (S830).

The MDMVR-related information in the CU may indicate whether MDMVR-related syntax elements are present in the CU syntax. For example, if the value of the MDMVR-related information is 1, it may indicate that the MDMVR-related syntax elements are present in the CU syntax, and then the MDMVR-related syntax elements may be signaled/parsed from the CU syntax.

If the value of the additional control information is 1, the decoding apparatus may determine that the MDMVR-related additional control information is present in the PPS syntax and may obtain the MDMVR-related additional control information (e.g., MDMVR-related syntax element) from the PPS (S840).

Then, the decoding apparatus may perform MDMVR based on the MDMVR-related information signaled from the PPS or CU.

The following drawings have been prepared to explain specific examples of the present disclosure. The names of specific devices or specific terms/names (e.g., names of syntax/syntax elements, etc.) described in the drawings are provided as examples, and therefore the technical features of the present disclosure are not limited to the specific terms/names used in the drawings below.

Figure 9:
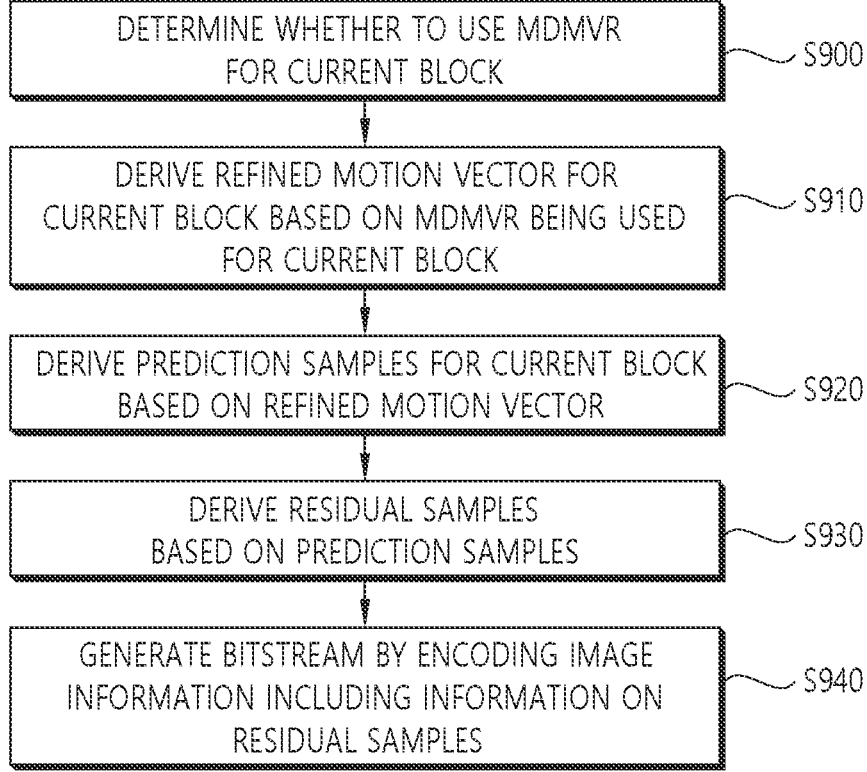
FIGS. 9 and 10 schematically show an example of a video/image encoding method and related components according to the embodiment(s) of the present disclosure.
Figure 10:
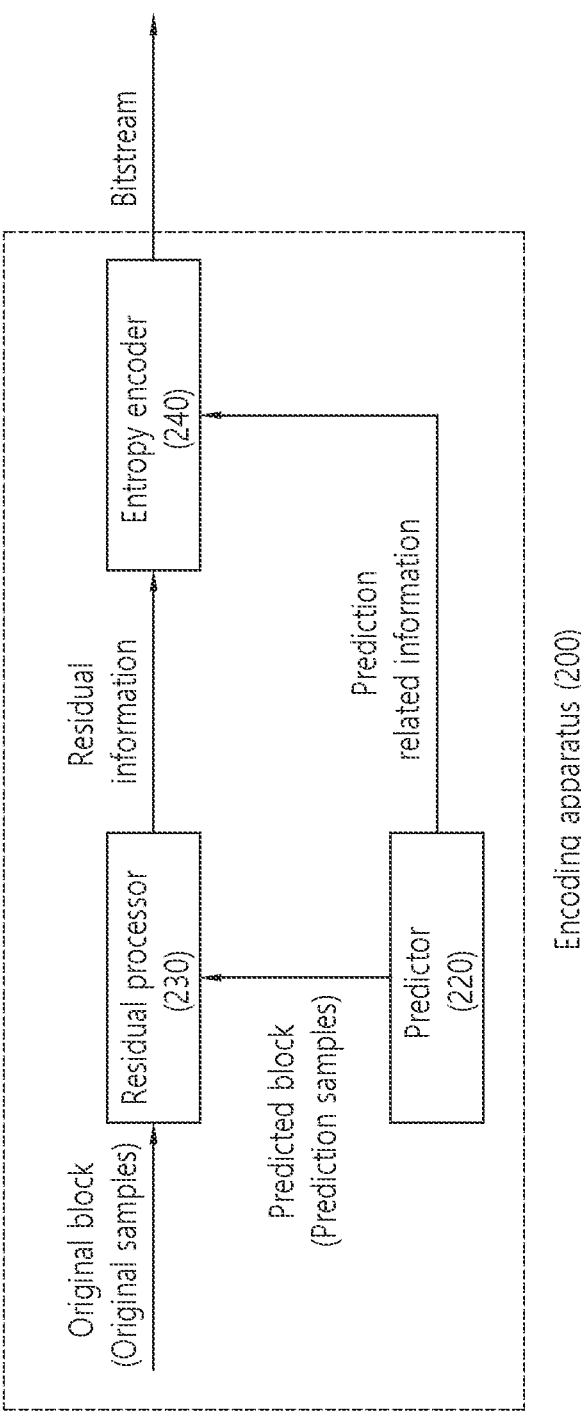

FIGS. 9 and 10 schematically show an example of a video/image encoding method and related components according to the embodiment(s) of the present disclosure.

The method disclosed in FIG. 9 may be performed by the encoding apparatus 200 disclosed in FIG. 2 or FIG. 10. Here, the encoding apparatus 200 disclosed in FIG. 10 is a simplified representation of the encoding apparatus 200 disclosed in FIG. 2. Specifically, steps S900 to S920 of FIG. 9 may be performed by the predictor 220 disclosed in FIG. 10, and step S930 of FIG. 9 may be performed by the residual processor 230 disclosed in FIG. 10, and step S940 of FIG. 9 may be performed by the entropy encoder 240 disclosed in FIG. 10. In addition, although not shown, the process of generating a reconstructed sample and a reconstructed picture for the current block based on the residual sample and prediction sample for the current block is performed by the adder 250 of the encoding apparatus 200. The process of encoding prediction information for the current block may be performed by the entropy encoder 240 of the encoding apparatus 200. In addition, the method disclosed in FIG. 9 may be performed including the embodiments described above in the present disclosure. Therefore, in FIG. 9, detailed descriptions of content that overlaps with the above-described embodiments will be omitted or simplified.

Referring to FIG. 9, the encoding apparatus may determine whether to use multi-layer Decoder-side Motion Vector Refinement (DMVR) (MDMVR) for the current block (S900).

Here, as described above, the multi-layer DMVR may be referred to as MDMVR, and may be used interchangeably with multi-pass DMVR, multi-level DMVR, or multi-stage DMVR.

That is, the encoding apparatus may determine whether to apply DMVR using multiple layers (or multiple passes, multiple levels, multiple stages, etc.) to derive the final refined motion vector for the current block.

At this time, the encoding apparatus may determine whether to use MDMVR for the current block according to the above-described embodiments.

In one embodiment, whether to use MDMVR may be determined based on information signaled in several parameter sets. For example, whether to use MDMVR may be determined based on first flag information related to indicating whether to use MDMVR. The first flag information may be signaled in a Sequence Parameter Set (SPS). In this case, whether to use MDMVR may be determined for the entire sequence, and by signaling additional control information at the sequence level, whether to apply MDMVR may be determined at a lower level (e.g., PPS (Picture Parameter Set)/PH (Picture header)/SH (Slice header)/CU (Coding unit) and/or other appropriate headers). As an example, based on the first flag information signaled in the SPS (i.e., based on the first flag information related to the MDMVR being used), for example, if the value of the first flag information is 1, second flag information related to the control of the MDMVR may be signaled. The second flag information is information for controlling whether MDMVR is used at a low level, and may be information related to whether a syntax element related to MDMVR is present in PPS, PH, SH, CU or another appropriate header.

As a specific example, as described with reference to FIGS. 7 and 8, based on the first flag information related to whether MDMVR at the SPS level is used (e.g., when the value of the first flag information is 1), the second flag information related to MDMVR control in PPS/PH may be signaled. At this time, if the second flag information indicates that the syntax elements related to MDMVR control are present in the PPS/PH, the syntax elements related to MDMVR control may be further signaled from the PPS/PH. Alternatively, if the second flag information indicates that the syntax elements related to MDMVR control are not present in the PPS/PH, the syntax elements related to MDMVR may be signaled at the lower level (e.g., CU, SH).

In addition, as an example, the first flag information signaled at a higher level (e.g., SPS) as described above may be binarized by fixed length coding. In addition, if the syntax elements related to MDMVR are signaled at lower levels such as PPS, PH, SH, CU based on the first flag and/or the second flag, the syntax elements related to MDMVR may be derived (i.e., parsed) based on context coding. For example, the syntax elements related to MDMVR may include detailed information necessary for performing MDMVR, such as the number of layers, the granularity of MDMVR application, whether early termination is explicitly used, etc. In addition, when performing context coding of the syntax elements related to MDMVR, the number of context models and initialization values may be determined, taking into account relevant aspects of block statistics.

In addition, in an embodiment, the current block may be a coding unit (CU) including at least one prediction unit (PU), and in this case, the number of layers of MDMVR may be determined for at least one PU. For example, the MDMVR may be applied to the first PU in the current block using two layers, and the MDMVR may be applied to the second PU in the current block using three layers. Alternatively, the number of MDMVR layers may be determined for each CU. In this case, all PUs in a CU may have the same number of layers.

In addition, in an embodiment, whether to use MDMVR may be determined based on Motion Vector Difference (MVD) information. For example, it may first decide whether to use DMVR based on whether the MVD exceeds a predetermined threshold. For example, if the MVD exceeds the predetermined threshold, it may be decided not to apply DMVR. At this time, the threshold may be selected in units of ¼ pixel (pel), ½ pixel (pel), 1 pixel (pel), 4 pixels (pel), and/or other appropriate MVD units. Alternatively, for a specific block size, the DMVR may not be applied if the above threshold is not satisfied. Alternatively, for example, it may be determined whether a single layer or multiple layers may be applied to the DMVR based on the threshold. For example, if the MVD is within a certain threshold range, the DMVR may be performed at the 16×16 level rather than the 8×8 level. In other words, it may be determined whether MDMVR is applied to the current block based on whether the MVD exceeds the predetermined threshold. For example, if the MVD exceeds the predetermined threshold, it may be determined not to apply MDMVR. In addition, the number of layers of MDMVR may be determined based on whether the MVD information is within the predetermined threshold range.

In addition, in an embodiment, based on the MDMVR being used in the current block (i.e., when the MDMVR is performed on the current block), the search pattern and the size of the search area may be determined for each layer of the MDMVR.

For example, each layer may have the same search pattern or different search patterns. In addition, for example, the search pattern may include a square, diamond, cross, rectangle, and/or other appropriate shapes to capture the underlying motion of the block. At this time, the search pattern may be determined based on a motion vector in the x-direction and a motion vector in the y-direction, or may be determined based on vertical motion and horizontal motion. For example, if the motion vector in the x-direction is larger than the motion vector in the y-direction, a rectangular search pattern may be more appropriate for capturing the underlying motion of the block. Alternatively, as an example, a diamond/cross-shaped search pattern may be more appropriate for blocks with more vertical motion.

In addition, for example, the size of the search area may be determined based on the block size. For example, if large blocks are used, 7×7/8×8, or larger, or other appropriate square/diamond search patterns may be used. Alternatively, as an example, if small blocks are used, the search area may have a size smaller than 5×5. Alternatively, as an example, the size of the search area may be determined based on basic motion information and motion characteristics of available neighboring blocks. For example, if the block MVD is greater than a predetermined threshold T, a 7×7 search area may be used.

In addition, for example, a search point may be determined based on a search pattern. For example, if there is an initial correlation with the search point, a larger size search pattern may be used. Then, if smaller size search patterns and fewer search points are considered, the search area in the layer may be reduced.

In addition, for example, the accuracy of the initial search pattern may be set on an integer-based, and the additional layer accuracy may be set as ½-pel or ¼-pel.

In addition, in an embodiment, the refined motion vector may be derived based on SAD (Sum of Absolute Differences) or MR-SAD (Mean Removed-Sum of Absolute Difference). In other words, the refined motion vector derived by applying MDMVR may measure distortion based on the SAD or MR-SAD, and the final refined motion vector may be derived based on this. In addition, in deriving the refined motion vector, the L0 norm or Euclidean norm (L2) may be used.

In addition, in an embodiment, the refined motion vector may be derived based on the minimum distortion cost with weight applied. Here, the minimum distortion cost may be calculated by applying the weight based on the case where distortion of a specific search point has priority over other search points. As an example, if the initial search point has to be prioritized over other points within the search range, the minimum distortion cost for the initial value(s) may be calculated by applying the weight for the initial error/distortion metric. Alternatively, as an example, the minimum distortion cost may be calculated by determining the weight considering the available motion information of neighboring blocks.

In addition, in an embodiment, based on the case where the MDMVR is used for the current block, the MDMVR may be performed by determining whether the termination condition is satisfied for each layer of MDMVR. The termination condition may determine the MDMVR termination for each layer based on whether the distance between the initial motion vector and the refined motion vector, the sample-based difference, or the SAD-based difference is less than a threshold. As an example, if the distance between the initial start MV and the MV (i.e., the refined MV) at the point during iterations is less than the threshold T, it may be determined that the termination condition is satisfied and the MDMVR may be terminated. In addition, in determining whether the termination condition is satisfied, it is possible to check between layers of MDMVR. For example, if it is determined that the termination condition is satisfied after the first layer of MDMVR, the MDMVR may not be performed for the remaining layers and may be terminated early.

In addition, in an embodiment, the reference samples may be pre-fetched and stored in memory while awaiting processing. For example, when pre-fetching samples, the samples may be padded with reference samples.

The encoding apparatus may derive a refined motion vector for the current block based on the MDMVR being used for the current block (S910).

That is, it may be determined whether the MDMVR is used for the current block according to the embodiment(s) described above. At this time, if it is determined that the MDMVR is used, the encoding apparatus may apply the MDMVR to the current block to derive the refined motion vector.

In an embodiment, when inter prediction is first performed on the current block, the encoding apparatus may derive motion information (motion vector, reference picture index, etc.) of the current block. For example, the encoding apparatus may search for a block similar to the current block within a certain area (search area) of reference pictures through motion estimation and may derive a reference block whose difference from the current block is minimum or below a certain standard. Based on this, a reference picture index indicating the reference picture where the reference block is located may be derived, and a motion vector may be derived based on the position difference between the reference block and the current block.

In addition, the encoding apparatus may determine the inter prediction mode applied to the current block among various prediction modes. The encoding apparatus may compare the RD cost for various prediction modes and determine the optimal prediction mode for the current block.

Thereafter, as described above, when it is determined to apply the MDMVR to the current block, the encoding apparatus may apply the MDMVR to the motion vector to finally derive the refined motion vector.

The encoding apparatus may derive prediction samples for the current block based on the refined motion vector (S920) and may derive residual samples for the current block based on the prediction samples (S930).

That is, the encoding apparatus may derive the residual samples based on the original samples for the current block and the prediction samples of the current block. And, the encoding apparatus may generate information about the residual samples. Here, the information about the residual samples may include information such as value information, position information, transform technique, transform kernel, and a quantization parameter of quantized transform coefficients derived by performing transform and quantization on the residual samples.

The encoding apparatus may encode image information (or video information) (S940). Here, the image information may include prediction-related information (e.g., prediction mode information). Additionally, the image information may include the residual information. That is, the image information may include various information derived from the encoding process, and may be encoded including such various information.

In an embodiment, the encoding apparatus may generate a bitstream by encoding the image information including the information about the residual samples. In addition, the encoding apparatus may generate a bitstream by encoding the image information including the prediction-related information (e.g., prediction mode information).

The image information including various information as described above may be encoded and output in the form of the bitstream. The bitstream may be transmitted to the decoding apparatus via a network or (digital) storage medium. Here, the network may include a broadcasting network and/or a communication network, and the digital storage medium may include various storage media such as USB, SD, CD, DVD, Blu-ray, HDD, and SSD.

Figure 11:
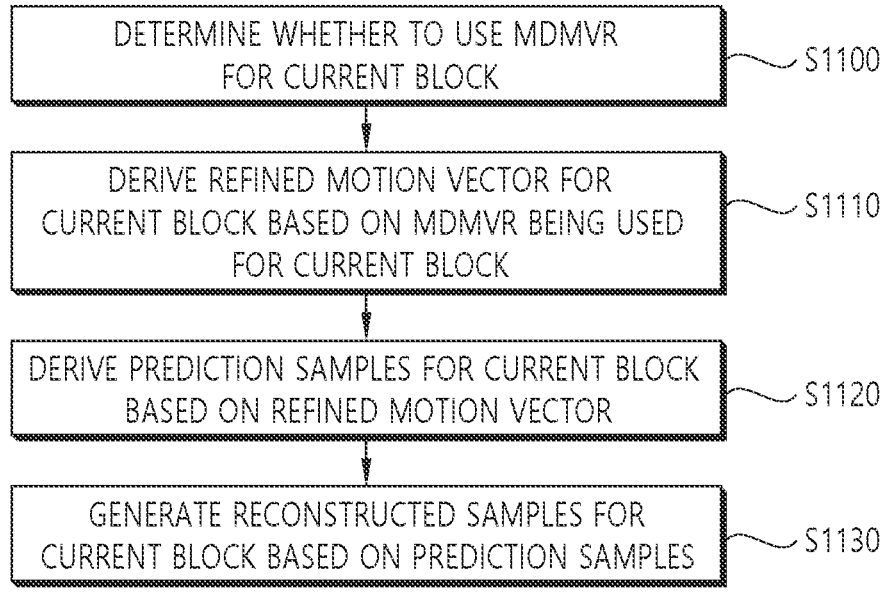
FIGS. 11 and 12 schematically show an example of a video/image decoding method and related components according to the embodiment(s) of the present disclosure.
Figure 12:
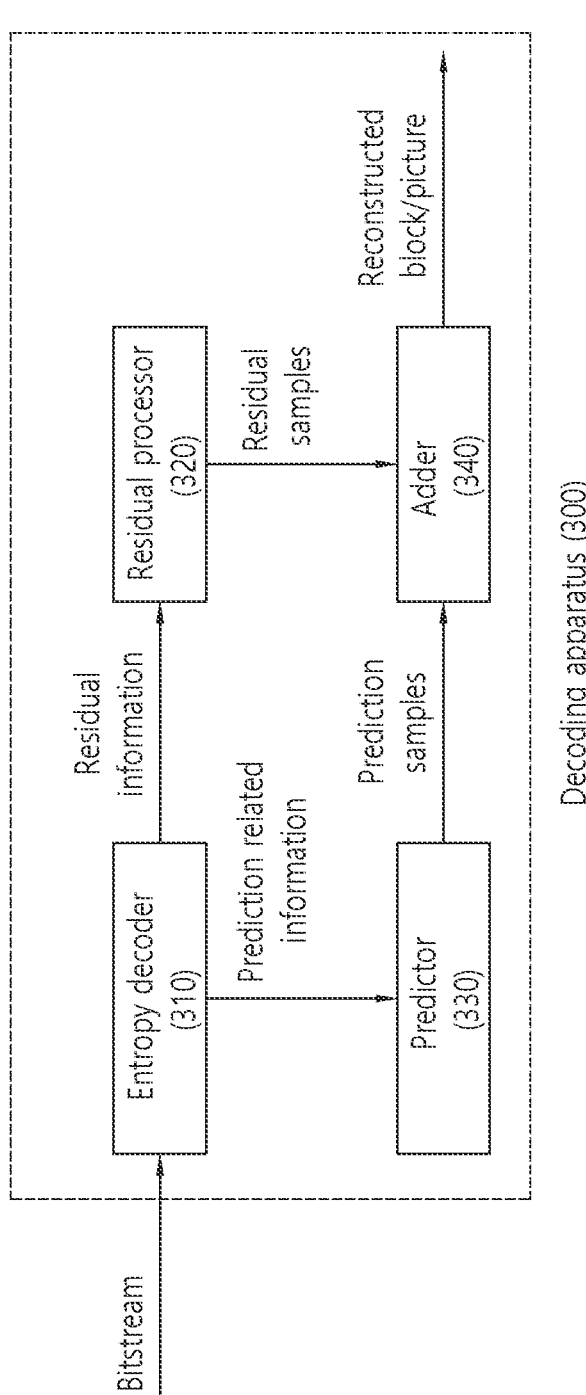

FIGS. 11 and 12 schematically show an example of a video/image decoding method and related components according to the embodiment(s) of the present disclosure.

The method disclosed in FIG. 11 may be performed by the decoding apparatus 300 disclosed in FIG. 3 or FIG. 12. Here, the decoding apparatus 300 disclosed in FIG. 12 is a simplified representation of the decoding apparatus 300 disclosed in FIG. 3. Specifically, step S1100 of FIG. 11 may be performed by the entropy decoder 310 and/or the predictor 330 disclosed in FIG. 12, and steps S1110 to S1120 of FIG. 11 may be performed by the predictor 330 disclosed in FIG. 12, and step S1130 of FIG. 11 may be performed by the adder 340 disclosed in FIG. 12. In addition, although not shown, the process of receiving prediction information and/or residual information for the current block may be performed by the entropy decoder 310 of the decoding apparatus 300. The process of deriving a residual sample for the current block based on residual information may be performed by the residual processor 320 of the decoding apparatus 3M). In addition, the method disclosed in FIG. 11 may be performed including the embodiments described above in the present disclosure. Therefore, in FIG. 11, detailed descriptions of content that overlaps with the above-described embodiments will be omitted or simplified.

Referring to FIG. 11, the decoding apparatus may determine whether to use multi-layer Decoder-side Motion Vector Refinement (DMVR) (MDMVR) for the current block (S1100).

Here, as described above, the multi-layer DMVR may be referred to as MDMVR, and may be used interchangeably with multi-pass DMVR, multi-level DMVR, or multi-stage DMVR.

That is, the decoding apparatus may determine whether to apply DMVR using multiple layers (or multiple passes, multiple levels, multiple stages, etc.) to derive the final refined motion vector for the current block.

At this time, the decoding apparatus may determine whether to use MDMVR for the current block according to the above-described embodiments.

In an embodiment, whether to use MDMVR may be determined based on information signaled in several parameter sets. For example, whether to use MDMVR may be determined based on first flag information related to indicating whether to use MDMVR. The first flag information may be signaled in a Sequence Parameter Set (SPS). In this case, whether to use MDMVR may be determined for the entire sequence, and by signaling additional control information at the sequence level, whether to apply MDMVR may be determined at a lower level (e.g., PPS (Picture Parameter Set)/PH (Picture header)/SH (Slice header)/CU (Coding unit) and/or other appropriate headers). As an example, based on the first flag information signaled in the SPS (i.e., based on the first flag information related to the MDMVR being used), for example, if the value of the first flag information is 1, second flag information related to the control of the MDMVR may be signaled. The second flag information is information for controlling whether MDMVR is used at a low level, and may be information related to whether a syntax element related to MDMVR is present in PPS, PH, SH, CU or another appropriate header.

As a specific example, as described with reference to FIGS. 7 and 8, based on the first flag information related to whether MDMVR at the SPS level is used (e.g., when the value of the first flag information is 1), the second flag information related to MDMVR control in PPS/PH may be signaled. At this time, if the second flag information indicates that the syntax elements related to MDMVR control are present in the PPS/PH, the syntax elements related to MDMVR control may be further signaled from the PPS/PH. Alternatively, if the second flag information indicates that the syntax elements related to MDMVR control are not present in the PPS/PH, the syntax elements related to MDMVR may be signaled at the lower level (e.g., CU, SH).

In addition, as an example, the first flag information signaled at a higher level (e.g., SPS) as described above may be binarized by fixed length coding. In addition, if the syntax elements related to MDMVR are signaled at lower levels such as PPS, PH, SH, CU based on the first flag and/or the second flag, the syntax elements related to MDMVR may be derived (i.e., parsed) based on context coding. For example, the syntax elements related to MDMVR may include detailed information necessary for performing MDMVR, such as the number of layers, the granularity of MDMVR application, whether early termination is explicitly used, etc. In addition, when performing context coding of the syntax elements related to MDMVR, the number of context models and initialization values may be determined, taking into account relevant aspects of block statistics.

In addition, in an embodiment, the current block may be a coding unit (CU) including at least one prediction unit (PU), and in this case, the number of layers of MDMVR may be determined for at least one PU. For example, the MDMVR may be applied to the first PU in the current block using two layers, and the MDMVR may be applied to the second PU in the current block using three layers. Alternatively, the number of MDMVR layers may be determined for each CU. In this case, all PUs in a CU may have the same number of layers.

In addition, in an embodiment, whether to use MDMVR may be determined based on Motion Vector Difference (MVD) information. For example, it may first decide whether to use DMVR based on whether the MVD exceeds a predetermined threshold. For example, if the MVD exceeds the predetermined threshold, it may be decided not to apply DMVR. At this time, the threshold may be selected in units of ¼ pixel (pel), ½ pixel (pel), 1 pixel (pel), 4 pixels (pel), and/or other appropriate MVD units. Alternatively, for a specific block size, the DMVR may not be applied if the above threshold is not satisfied. Alternatively, for example, it may be determined whether a single layer or multiple layers may be applied to the DMVR based on the threshold. For example, if the MVD is within a certain threshold range, the DMVR may be performed at the 16×16 level rather than the 8×8 level. In other words, it may be determined whether MDMVR is applied to the current block based on whether the MVD exceeds the predetermined threshold. For example, if the MVD exceeds the predetermined threshold, it may be determined not to apply MDMVR. In addition, the number of layers of MDMVR may be determined based on whether the MVD information is within the predetermined threshold range.

In addition, in an embodiment, based on the MDMVR being used in the current block (i.e., when the MDMVR is performed on the current block), the search pattern and the size of the search area may be determined for each layer of the MDMVR.

For example, each layer may have the same search pattern or different search patterns. In addition, for example, the search pattern may include a square, diamond, cross, rectangle, and/or other appropriate shapes to capture the underlying motion of the block. At this time, the search pattern may be determined based on a motion vector in the x-direction and a motion vector in the y-direction, or may be determined based on vertical motion and horizontal motion. For example, if the motion vector in the x-direction is larger than the motion vector in the y-direction, a rectangular search pattern may be more appropriate for capturing the underlying motion of the block. Alternatively, as an example, a diamond/cross-shaped search pattern may be more appropriate for blocks with more vertical motion.

In addition, for example, the size of the search area may be determined based on the block size. For example, if large blocks are used, 7×7/8×8, or larger, or other appropriate square/diamond search patterns may be used. Alternatively, as an example, if small blocks are used, the search area may have a size smaller than 5×5. Alternatively, as an example, the size of the search area may be determined based on basic motion information and motion characteristics of available neighboring blocks. For example, if the block MVD is greater than a predetermined threshold T, a 7×7 search area may be used.

In addition, for example, a search point may be determined based on a search pattern. For example, if there is an initial correlation with the search point, a larger size search pattern may be used. Then, if smaller size search patterns and fewer search points are considered, the search area in the layer may be reduced.

In addition, for example, the accuracy of the initial search pattern may be set on an integer-based, and the additional layer accuracy may be set as ½-pel or ¼-pel.

In addition, in an embodiment, the refined motion vector may be derived based on SAD (Sum of Absolute Differences) or MR-SAD (Mean Removed-Sum of Absolute Difference). In other words, the refined motion vector derived by applying MDMVR may measure distortion based on the SAD or MR-SAD, and the final refined motion vector may be derived based on this. In addition, in deriving the refined motion vector, the L0 norm or Euclidean norm (L2) may be used.

In addition, in an embodiment, the refined motion vector may be derived based on the minimum distortion cost with weight applied. Here, the minimum distortion cost may be calculated by applying the weight based on the case where distortion of a specific search point has priority over other search points. As an example, if the initial search point has to be prioritized over other points within the search range, the minimum distortion cost for the initial value(s) may be calculated by applying the weight for the initial error/distortion metric. Alternatively, as an example, the minimum distortion cost may be calculated by determining the weight considering the available motion information of neighboring blocks.

In addition, in an embodiment, based on the case where the MDMVR is used for the current block, the MDMVR may be performed by determining whether the termination condition is satisfied for each layer of MDMVR. The termination condition may determine the MDMVR termination for each layer based on whether the distance between the initial motion vector and the refined motion vector, the sample-based difference, or the SAD-based difference is less than a threshold. As an example, if the distance between the initial start MV and the MV (i.e., the refined MV) at the point during iterations is less than the threshold T, it may be determined that the termination condition is satisfied and the MDMVR may be terminated. In addition, in determining whether the termination condition is satisfied, it is possible to check between layers of MDMVR. For example, if it is determined that the termination condition is satisfied after the first layer of MDMVR, the MDMVR may not be performed for the remaining layers and may be terminated early.

In addition, in an embodiment, the reference samples may be pre-fetched and stored in memory while awaiting processing. For example, when pre-fetching samples, the samples may be padded with reference samples.

The decoding apparatus may derive a refined motion vector for the current block based on the MDMVR being used for the current block (S1110).

That is, it may be determined whether the MDMVR is used for the current block according to the embodiment(s) described above. At this time, if it is determined that the MDMVR is used, the decoding apparatus may apply the MDMVR to the current block to derive the refined motion vector.

In an embodiment, the decoding apparatus may first obtain image information including prediction-related information from a bitstream and determine a prediction mode for the current block based on the prediction-related information. And, the decoding apparatus may derive motion information (motion vector, reference picture index, etc.) of the current block based on the prediction mode. Here, the prediction mode may include skip mode, merge mode, (A)MVP mode, etc.

Thereafter, as described above, when it is determined to apply the MDMVR to the current block, the decoding apparatus may apply the MDMVR to the motion vector to finally derive the refined motion vector.

The decoding apparatus may derive prediction samples for the current block based on the refined motion vector (S1120) and generate reconstructed samples for the current block based on the prediction samples (S1130).

In an embodiment, the decoding apparatus may directly use prediction samples as the reconstructed samples depending on the prediction mode, or may generate the reconstructed samples by adding the residual samples to the prediction samples.

If the residual sample for the current block exists, the decoding apparatus may receive information about the residual for the current block. The information about the residual may include transformation coefficients about the residual samples. The decoding apparatus may derive the residual samples (or residual sample array) for the current block based on the residual information. Specifically, the decoding apparatus may derive quantized transform coefficients based on the residual information. The quantized transform coefficients may have a one-dimensional vector form based on the coefficient scan order. The decoding apparatus may derive transform coefficients based on a dequantization process for the quantized transform coefficients. The decoding apparatus may derive the residual samples based on the transform coefficients.

The decoding apparatus may generate the reconstructed samples based on the prediction samples and the residual samples, and may derive a reconstructed block or reconstructed picture based on the reconstructed samples. Specifically, the decoding apparatus may generate the reconstructed samples based on the sum between the prediction samples and the residual samples. Thereafter, as described above, the decoding apparatus may apply an in-loop filtering procedure, such as deblocking filtering and/or SAO procedure, to the reconstructed picture in order to improve subjective/objective picture quality, if necessary.

In the above-described embodiment, the methods are described based on the flowchart having a series of steps or blocks. The embodiments of the present disclosure are not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The above-described method according to the embodiments of the present disclosure may be implemented in the form of software, and the encoding apparatus and/or decoding apparatus according to the present disclosure may be included in devices that perform image processing, such as a TV, computer, smartphone, set-top box, display device.

When the embodiments in the present disclosure are implemented as software, the above-described method may be implemented as a module (process, function, etc.) that performs the above-described functions. The module may be stored in memory and executed by a processor. The memory may be internal or external to the processor, and may be coupled with the processor in a variety of well-known means. The processor may include an application-specific integrated circuit (ASIC), other chipsets, logic circuits, and/or data processing devices. The memory may include read-only memory (ROM), random access memory (RAM), flash memory, memory cards, storage media, and/or other storage devices. That is, the embodiments described in the present disclosure may be implemented and performed on a processor, microprocessor, controller, or chip. For example, functional units shown in each drawing may be implemented and performed on a computer, processor, microprocessor, controller, or chip. In this case, information for implementation (e.g., information on instructions) or an algorithm may be stored in a digital storage medium.

In addition, the decoding apparatus and the encoding apparatus to which the embodiment(s) of the present disclosure are applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VOD service providing apparatus, an Over the top (OTT) video apparatus, an Internet streaming service providing apparatus, a three-dimensional (3D) video apparatus, a virtual reality (VR) apparatus, an augmented reality (AR) apparatus, a teleconference video apparatus, a transportation user equipment (e.g., vehicle(including autonomous vehicles) user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the embodiment(s) of the present disclosure is applied may be produced in the form of a program that is to be executed by a computer and may be stored in a computer-readable recording medium. Multimedia data having a data structure according to the embodiment(s) of the present disclosure may also be stored in computer-readable recording media. The computer-readable recording media include all types of storage devices and distributed storage devices in which data readable by a computer system is stored. The computer-readable recording media may include, for example, a Blu-ray Disk (BD), a Universal Serial Bus (USB), ROM, PROM, EPROM, EEPROM, RAM, CD-ROM, a magnetic tape, a floppy disk, and an optical data storage device. Furthermore, the computer-readable recording media includes media implemented in the form of carrier waves (e.g., transmission through the Internet). In addition, a bitstream generated by the encoding method may be stored in a computer-readable recording medium or may be transmitted over wired/wireless communication networks.

In addition, the embodiment(s) of the present disclosure may be implemented with a computer program product according to program codes, and the program codes may be performed in a computer by the embodiment(s) of the present disclosure. The program codes may be stored on a carrier which is readable by a computer.

Figure 13:
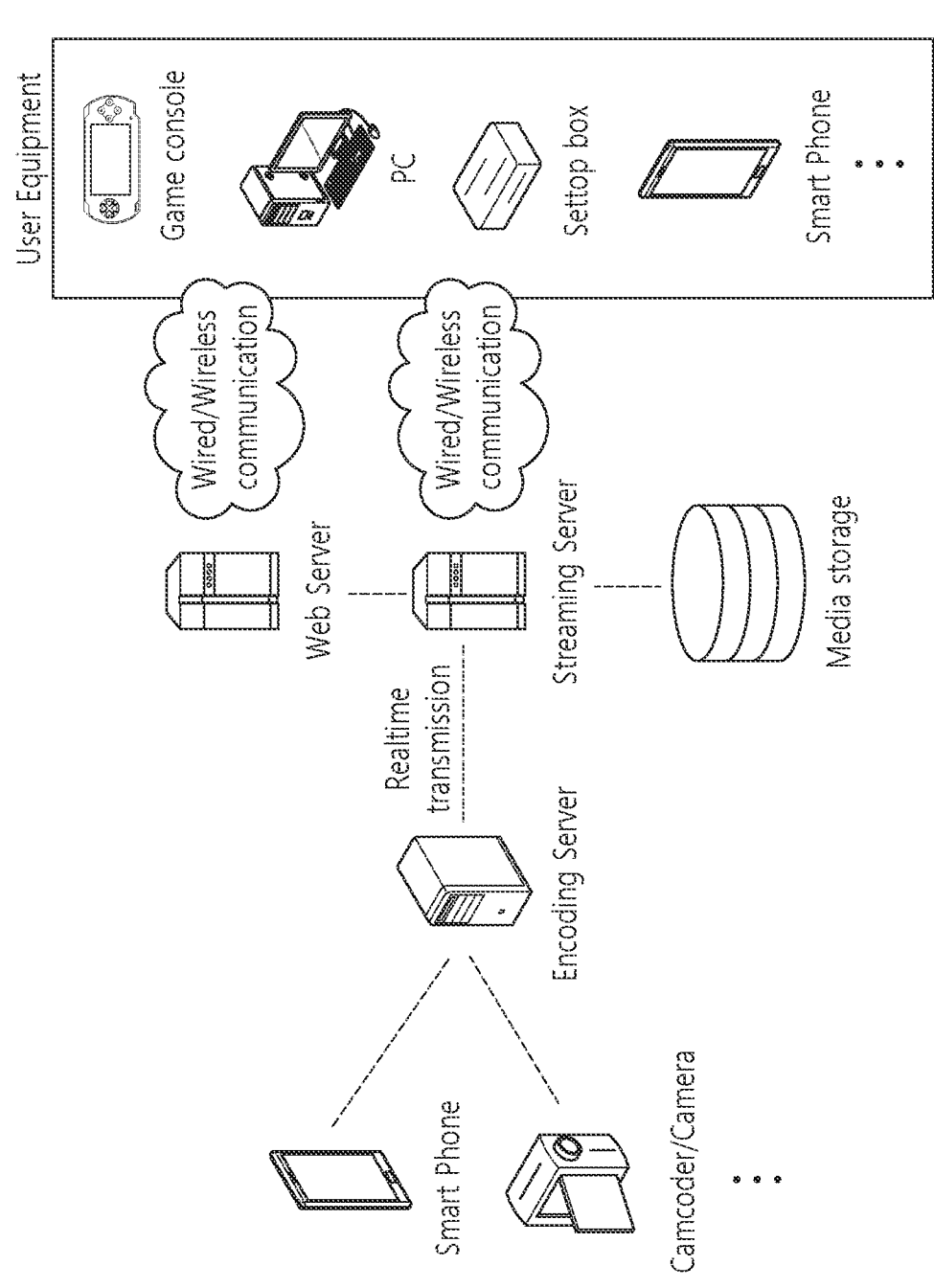
FIG. 13 illustrates an example of a content streaming system to which embodiments disclosed in the present disclosure may be applied.

FIG. 13 illustrates an example of a content streaming system to which embodiments disclosed in the present disclosure may be applied.

Referring to FIG. 13, the content streaming system to which the embodiments of the present document are applied may basically include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of what services are available. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., Smartwatches, smart glasses, head mounted displays), digital TVs, desktops computer, digital signage, and the like.

Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim of the present disclosure may be combined to be implemented as an apparatus, and the technical features of the method claim of the present disclosure and the technical features of the apparatus claim of the present disclosure may be combined to be implemented as a method.

What is claimed is:

1. An image decoding method performed by a decoding apparatus, the method comprising:
determining whether multi-layer Decoder-side Motion Vector Refinement (MDMVR) is used for a current block;
deriving a refined motion vector for the current block based on the MDMVR being used for the current block;
deriving prediction samples for the current block based on the refined motion vector; and
generating reconstructed samples for the current block based on the prediction samples,
wherein whether the MDMVR is used is determined based on first flag information related to whether to use the MDMVR,
wherein the first flag information is signaled in Sequence Parameter Set (SPS),
wherein second flag information related to control of the MDMVR is signaled based on the first flag information related to use of the MDMVR, and
wherein the second flag information is information related to whether a syntax element related to the MDMVR is present in a Picture Parameter Set (PPS), Picture header (PH), Slice header (SH), or Coding unit (CU).

2. The image decoding method of claim 1, wherein the first flag information is binarized by fixed length coding.

3. The image decoding method of claim 1, wherein the syntax element related to the MDMVR is signaled in the PPS, the PH, the SH or the CU based on the second flag information, and
wherein the syntax element related to the MDMVR is derived based on context coding.

4. The image decoding method of claim 1, wherein the current block includes at least one Prediction unit (PU), and
wherein a number of layers of the MDMVR is determined for the at least one PU.

5. The image decoding method of claim 1, wherein whether the MDMVR is used is determined based on Motion Vector Difference (MVD) information, and
wherein whether the MDMVR is applied to the current block is determined based on whether the MVD information exceeds a predetermined threshold.

6. The image decoding method of claim 5, wherein a number of layers of the MDMVR is determined based on whether the MVD information is within a predetermined threshold range.

7. The image decoding method of claim 1, wherein a search pattern and a size of a search area are determined for each layer of the MDMVR, based on the MDMVR being used for the current block,
wherein the search pattern is determined based on a motion vector in a x direction and a motion vector in a y direction, or is determined based on vertical motion and horizontal motion, and
wherein the size of the search area is determined based on a block size.

8. The image decoding method of claim 1, wherein the refined motion vector is derived based on Sum of Absolute Differences (SAD) or Mean Removed-Sum of Absolute Difference (MR-SAD).

9. The image decoding method of claim 1, wherein the refined motion vector is derived based on a minimum distortion cost with weight applied, and
wherein the minimum distortion cost is calculated by applying the weight based on the case where distortion of a specific search point is prioritized.

10. The image decoding method of claim 1, wherein based on the MDMVR being used for the current block, it is determined whether a termination condition is satisfied for each layer of the MDMVR, and
wherein the termination condition determines the MDMVR termination for each layer based on whether a distance between an initial motion vector and a refined motion vector, a sample-based difference, or a SAD-based difference is less than a threshold.

11. An image encoding method performed by an encoding apparatus, the method comprising:
determining whether multi-layer Decoder-side Motion Vector Refinement (MDMVR) is used for a current block;
deriving a refined motion vector for the current block based on the MDMVR being used for the current block;
deriving prediction samples for the current block based on the refined motion vector;
deriving residual samples based on the prediction samples; and
generating a bitstream by encoding image information including information on the residual samples,
wherein whether the MDMVR is used is determined based on first flag information related to whether to use the MDMVR,
wherein the first flag information is signaled in Sequence Parameter Set (SPS), wherein second flag information related to control of the MDMVR is signaled based on the first flag information related to use of the MDMVR, and wherein the second flag information is information related to whether a syntax element related to the MDMVR is present in a Picture Parameter Set (PPS), Picture header (PH), Slice header (SH), or Coding unit (CU).

12. A transmission method of data comprising a bitstream of image information, the transmission method comprising:

obtaining the bitstream of the image information, wherein the bitstream is generated based on determining whether multi-layer Decoder-side Motion Vector Refinement (MDMVR) is used for a current block, deriving a refined motion vector for the current block based on the MDMVR being used for the current block, deriving prediction samples for the current block based on the refined motion vector, deriving residual samples based on the prediction samples, encoding image information including information on the residual samples; and transmitting the data comprising the bitstream to an image decoding apparatus, wherein whether the MDMVR is used is determined based on first flag information related to whether to use the MDMVR, wherein the first flag information is signaled in Sequence Parameter Set (SPS), wherein second flag information related to control of the MDMVR is signaled based on the first flag information related to use of the MDMVR, and wherein the second flag information is information related to whether a syntax element related to the MDMVR is present in a Picture Parameter Set (PPS), Picture header (PH), Slice header (SH), or Coding unit (CU).

* * * * *